(12) United States Patent
Moriya et al.

(10) Patent No.: US 11,810,581 B2
(45) Date of Patent: Nov. 7, 2023

(54) MULTIPOINT CONTROL METHOD, APPARATUS AND PROGRAM

(71) Applicant: NIPPON TELEGRAPH AND TELEPHONE CORPORATION, Tokyo (JP)

(72) Inventors: Takehiro Moriya, Tokyo (JP); Yutaka Kamamoto, Tokyo (JP); Ryosuke Sugiura, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 328 days.

(21) Appl. No.: 17/422,711

(22) PCT Filed: Jan. 7, 2020

(86) PCT No.: PCT/JP2020/000101
§ 371 (c)(1),
(2) Date: Jul. 13, 2021

(87) PCT Pub. No.: WO2020/149164
PCT Pub. Date: Jul. 23, 2020

(65) Prior Publication Data
US 2022/0084530 A1    Mar. 17, 2022

(30) Foreign Application Priority Data

Jan. 17, 2019  (JP) ................................. 2019-006306

(51) Int. Cl.
*G10L 19/008*   (2013.01)
*G10L 19/16*    (2013.01)
(Continued)

(52) U.S. Cl.
CPC .......... *G10L 19/008* (2013.01); *G10L 19/173* (2013.01); *H04M 3/561* (2013.01); *H04M 3/568* (2013.01); *H04M 7/006* (2013.01)

(58) Field of Classification Search
CPC ..... G10L 19/008; G10L 19/173; G10L 19/24; H04M 3/561; H04M 3/568; H04M 7/006; H04L 65/403; H04L 65/80
(Continued)

(56) References Cited

U.S. PATENT DOCUMENTS 7,619,995 B1 * 11/2009 El-Hennawey ..... H04L 12/1827
                                                        370/266
2010/0316232 A1   12/2010 Acero et al.
2015/0055770 A1   2/2015  Spittle et al.

FOREIGN PATENT DOCUMENTS

CN    101877643 A  * 11/2010  ........... G10L 19/008
FR    3003683 A1  *  9/2014  ........... G10L 19/167
JP    2005-229259 A    8/2005

OTHER PUBLICATIONS

Dolby Laboratories Inc. (2018) "IVAS design constraints from an end-to-end perspective" 3GPP TSG-SA4#100 meeting, Oct. 15-19, 2018, Kochi, India, 12 pages.
(Continued)

*Primary Examiner* — Pierre Louis Desir
*Assistant Examiner* — Fouzia Hye Solaiman

(57) ABSTRACT

A technique is provided that can reduce degradation of the sound quality due to a tandem connection of paired coding and decoding, and can reduce the operation processing amount and the required memory amount of a multipoint control unit. In multipoint connection between terminals of a plurality of communication networks (for example, a fixed phone line and a mobile phone line) having different communication capacities, when a multichannel coding including a monaural coding scheme of a communication network
(Continued)

having a smaller communication capacity is used in a communication network having a larger communication capacity to transmit sounds of a plurality points to the communication network terminal having the larger communication capacity, control is exercised such that monaural codes of the plurality points are output.

7 Claims, 14 Drawing Sheets

(51) Int. Cl.
      *H04M 3/56*       (2006.01)
      *H04M 7/00*       (2006.01)

(58) Field of Classification Search
      USPC .......................................................... 704/500
      See application file for complete search history.

(56) References Cited

OTHER PUBLICATIONS

Smith et al. (2002) "Speaker Selection for Tandem-Free Operation VOIP Conference Bridges" IEEE Speech Coding Workshop. Proceedings—Ibaraki, Japan (Oct. 6-9, 2002).

\* cited by examiner

MULTIPOINT CONTROL METHOD, APPARATUS AND PROGRAM

CROSS-REFERENCE TO RELATED APPLICATIONS

This application is a U.S. 371 Application of International Patent Application No. PCT/JP2020/000101, filed on 7 Jan. 2020, which application claims priority to and the benefit of JP Application No. 2019-006306, filed on 17 Jan. 2019, the disclosures of which are hereby incorporated herein by reference in their entireties.

TECHNICAL FIELD

The present invention relates to at least one of a control technique in a multipoint control unit (MCU) for a multipoint phone conference, a coding technique of a sound signal at each point, and a decoding technique of a sound signal at each point.

BACKGROUND ART

The technique disclosed in Patent Literature (PTL) 1 is known as a related technique for the control in a multipoint control unit for multipoint phone conferencing, coding of sound signals at each point, and decoding of sound signals at each point. The technique disclosed in PTL 1 uses embedded coding through basic quality coding and quality extension coding. The sound signal coding apparatus at each point obtains a code by performing embedded coding through basic quality coding and quality extension coding on input sound signals, and outputs the code to the multipoint control unit. For a basic quality coding part, the multipoint control unit obtains sound signals by decoding the codes of all points, mixes the obtained sound signals, codes the mixed sound signal, and outputs a code obtained from the mixed sound signal to each point. On the other hand, for a quality extension coding part, the multipoint control unit (a) selects a code of one most important point so as to send the code to each point; or (b) obtains sound signals by decoding codes of a plurality of highly important points, mixes the obtained sound signals, codes the mixed sound signal and outputs the code obtained from the mixed sound signal to each point. A sound signal decoding apparatus of each point obtains a sound signal including the basic quality part of all points and the quality expansion part of the highly important point by decoding the code output by the multipoint control unit.

CITATION LIST

Patent Literature

PTL 1 JP 2005-229259 A

SUMMARY OF THE INVENTION

Technical Problem

In the technique disclosed in PTL 1, the basic quality part is necessarily decoded at the multipoint control unit before it is coded, and the paired coding and decoding are connected in tandem. Thus, when the technique disclosed in PTL 1 is implemented using a coding and decoding scheme used in mobile communication that entails high compression, a large operation processing amount and a large memory amount, the sound quality may be significantly degraded due to the tandem connection of paired coding and decoding, and the operation processing amount and the required memory amount of the multipoint control unit may be increased due to a large number of decoding processes and coding processes.

Means for Solving the Problem

A multipoint control method according to an aspect of the present invention is a method in a multipoint control unit to which two or more first communication network terminal apparatuses and one or more second communication network terminal apparatuses are connected through a communication path, the number of points at which the two or more first communication network terminal apparatuses are located being M (M is an integer of 2 or greater), the number of points at which the one or more second communication network terminal apparatuses are located being N (N is an integer of 1 or greater), the method including: a point selecting step of, for a predetermined time period, selecting, by the multipoint control unit, one point or two points from among M points at which the two or more first communication network terminal apparatuses are located and N points at which the one or more second communication network terminal apparatuses are located, a bit stream input from each first communication network terminal apparatus to the multipoint control unit through the communication path being a bit stream including, as codes representing a sound signal, a monaural code $CFM_m$ (m is an integer from 1 to M) obtained by coding a mixed signal of sound signals of two or more channels input to the first communication network terminal apparatus by a first coding scheme and an extension code $CFE_m$ including a code representing information corresponding to a difference between the input sound signals of two or more channels, and a bit stream input from each second communication network terminal apparatus to the multipoint control unit through the communication path being a bit stream including, as a code representing a sound signal, a monaural code $CMM_n$ (n is an integer from 1 to N) obtained by coding a sound signal of one channel input to the second communication network terminal apparatus by the first coding scheme; and a bit stream generating step of, when two first communication network terminal apparatuses of two points of an $M_1$-th point and an $M_2$-th point ($M_1$ is an integer from 1 to M, and $M_2$ is an integer from 1 to M and different from $M_1$) are selected from the two or more first communication network terminal apparatuses and the one or more second communication network terminal apparatuses, generating and outputting, by the multipoint control unit, as a bit stream for an unselected first communication network terminal apparatus of the two or more first communication network terminal apparatuses that is located at a point that is not selected in the point selecting step, a bit stream including, as codes representing a sound signal, a monaural code $CFM_{M1}$ of codes representing a sound signal of the $M_1$-th point and a monaural code $CFM_{M2}$ of codes representing a sound signal of the $M_2$-th point.

Effects of the Invention

According to the present invention, even when a high-compression coding scheme such as that used in mobile communication is used for implementation, degradation of the sound quality due to a tandem connection of paired coding and decoding can be reduced, and the operation processing amount and the required memory amount of the multipoint control unit can be reduced.

DESCRIPTION OF EMBODIMENTS

Figure 1:
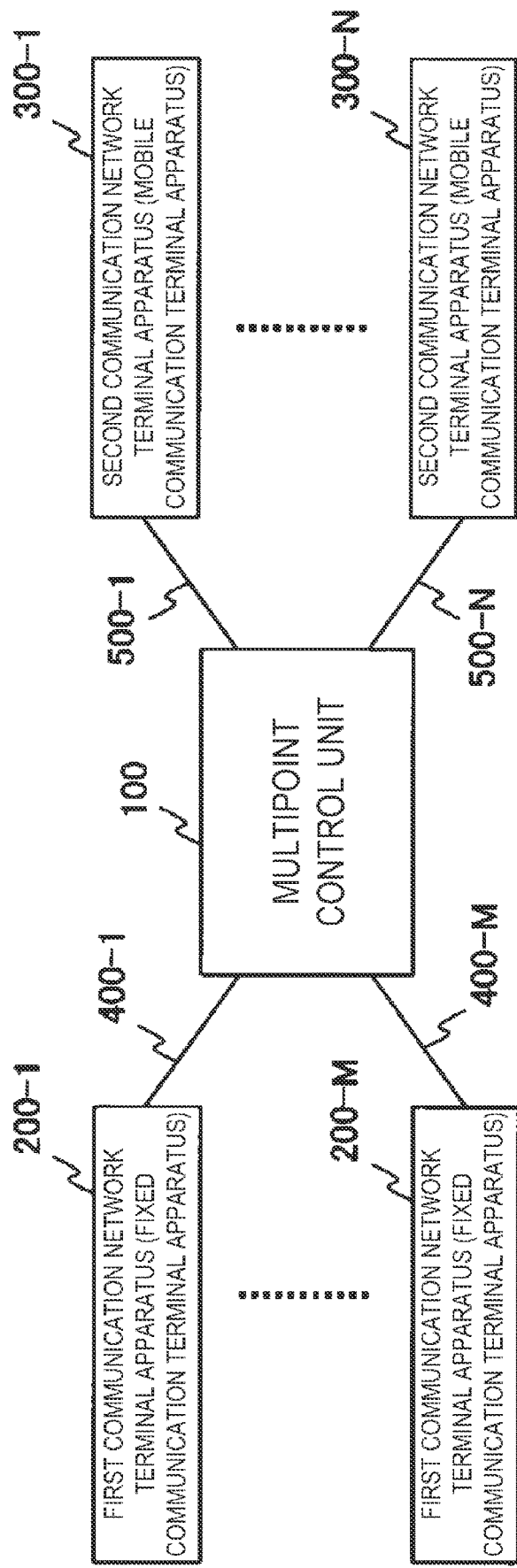
FIG. 1 is a block diagram illustrating an example of a multipoint phone connection system.

As illustrated in FIG. 1, a multipoint phone connection system 10 includes a multipoint control unit 100, a first communication network terminal apparatus 200-$m$ (m is an integer from 1 to M), and a second communication network terminal apparatus 300-$n$ (n is an integer from 1 to N). The multipoint control unit 100 and each first communication network terminal apparatus 200-$m$ are connected to each other through each transmission path 400-$m$ of a first communication network. The multipoint control unit 100 and each second communication network terminal apparatus 300-$n$ are connected to each other through each transmission path 500-$n$ of a second communication network. The first communication network and the second communication network are communication networks that differ from each other in the communication capacity for real-time transmission. The communication capacity of each transmission path 400-$m$ of the first communication network in each direction is equal to or greater than K times (K is an integer of 2 or greater) the communication capacity of each transmission path 500-$n$ of the second communication network in each direction, and the total number of the first communication network terminal apparatuses and the second communication network terminal apparatuses is K+1 or greater. The K+1 or greater terminal apparatuses include at least one first communication network terminal apparatus and at least one second communication network terminal apparatus, and each terminal apparatus can playback decoded sound signals corresponding to sound signals of terminal apparatuses at up to K points. That is, in the present invention, it suffices M≥1, N≥1, and M+N≥K+1. In the present invention, there is no limitation on whether each communication network is fixed communication or mobile communication, or in other words, whether the transmission path of each communication network is a wired transmission path or a wireless transmission path, and the like.

The present invention is also applicable to a case where the first communication network is an existing fixed phone communication network and the second communication network is an existing mobile phone communication network, for example. In view of this, for ease of understanding, the following embodiments are described with an example in which the first communication network is assumed to be an existing fixed phone communication network and the second communication network is assumed to be an existing mobile phone communication network, or more specifically, an example in which the first communication network terminal apparatus 200-$m$ is a fixed communication terminal apparatus 200-$m$, the second communication network terminal apparatus 300-$n$ is a mobile communication terminal apparatus 300-$n$, the transmission path 400-$m$ of the first communication network is a fixed transmission path 400-$m$, and the transmission path 500-$n$ of the second communication network is a mobile transmission path 500-$n$, as illustrated in FIG. 1.

First Embodiment

First, a configuration of a multipoint phone connection system and each apparatus included in the multipoint phone connection system in a first embodiment are described.

Multipoint Phone Connection System 10

As illustrated in FIG. 1, the multipoint phone connection system 10 according to the first embodiment includes the multipoint control unit 100, a plurality of (M) fixed communication terminal apparatuses 200-$m$ (m is an integer from 1 to M), and a plurality of (N) mobile communication terminal apparatuses 300-$n$ (n is an integer from 1 to N). In the present embodiment, descriptions will be made on the assumption that two or more fixed communication terminal apparatuses 200-$m$ and two or more mobile communication terminal apparatuses 300-$n$ are provided. That is, in the present embodiment, M is an integer of 2 or greater, and N is an integer of 2 or greater. The multipoint control unit 100 and each fixed communication terminal apparatus 200-$m$ are connected to each other through each fixed transmission path 400-$m$ having a communication capacity sufficient for performing the real-time transmission of a code equivalent to one channel of a coding scheme of a phone band voice for a fixed phone, such as a transmission path for a voice line of a fixed phone of 64 kbps in each of up and down directions, for example. The coding scheme of a phone band voice for a fixed phone is ITU-T G.711, for example. The multipoint control unit 100 and each mobile communication terminal apparatus 300-$n$ are connected to each other through each mobile transmission path 500-$n$ having a communication capacity sufficient for real-time transmission of a code equivalent to one channel of a coding scheme of a phone band voice for a mobile phone, such as a transmission path for a voice line of a mobile phone of 13.2 kbps in each of up and down directions, for example. The coding scheme of a phone band voice for a mobile phone is 13.2 kbps mode of 3GPP EVS standard (3GPP TS26.442), for example.

Fixed Communication Terminal Apparatus 200-*m*

Figure 2:
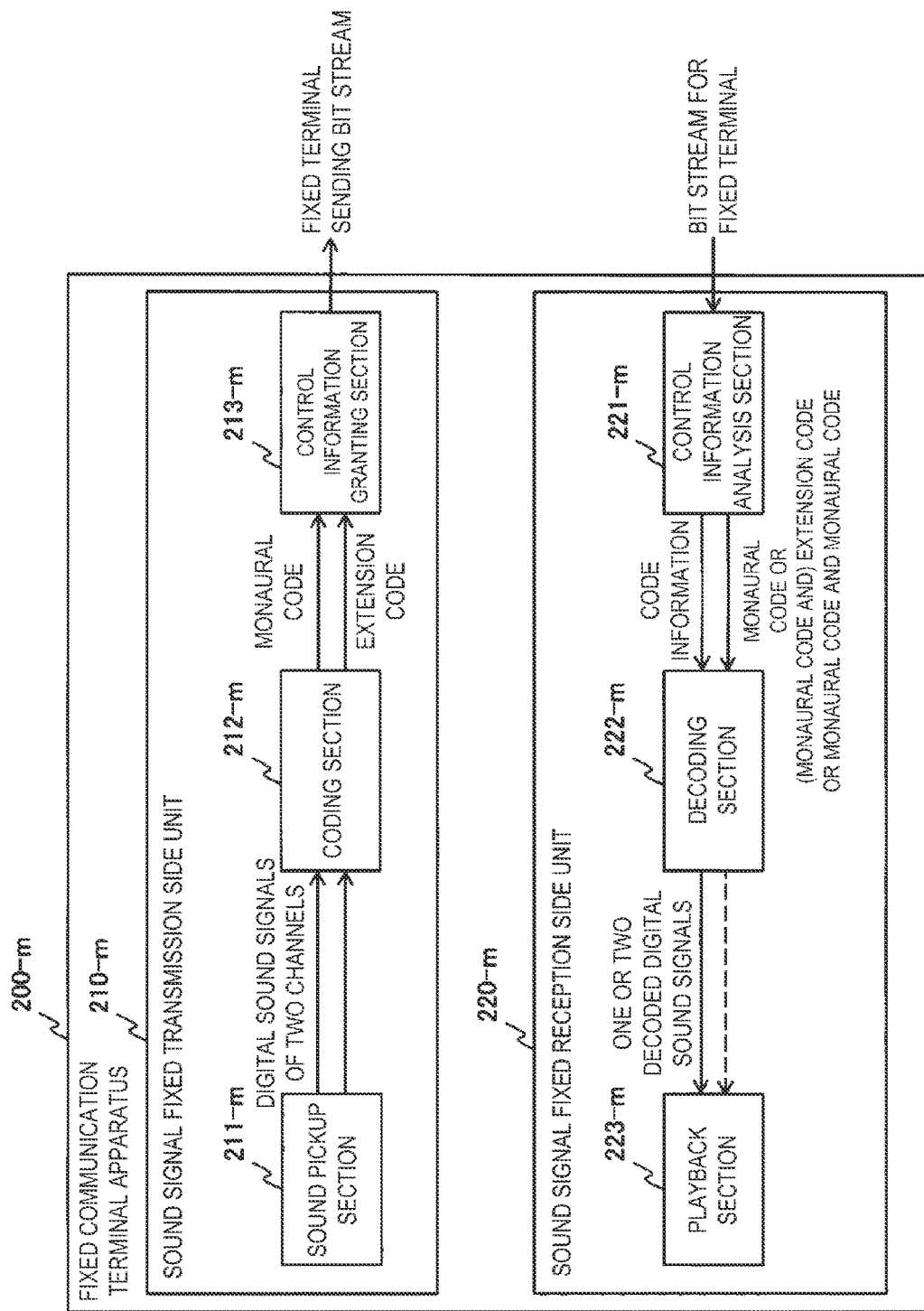
FIG. 2 is a block diagram illustrating an example of a fixed communication terminal apparatus.

The fixed communication terminal apparatus 200-*m* is an advanced phone or a PC provided with a microphone and a speaker, and includes a sound signal fixed transmission side unit 210-*m* and a sound signal fixed reception side unit 220-*m* as illustrated in FIG. 2, for example. The sound signal fixed transmission side unit 210-*m* includes a sound pickup section 211-*m*, a coding section 212-*m* and a control information granting section 213-*m*. The sound signal fixed reception side unit 220-*m* includes a control information analysis section 221-*m*, a decoding section 222-*m* and a playback section 223-*m*.

Figure 10:
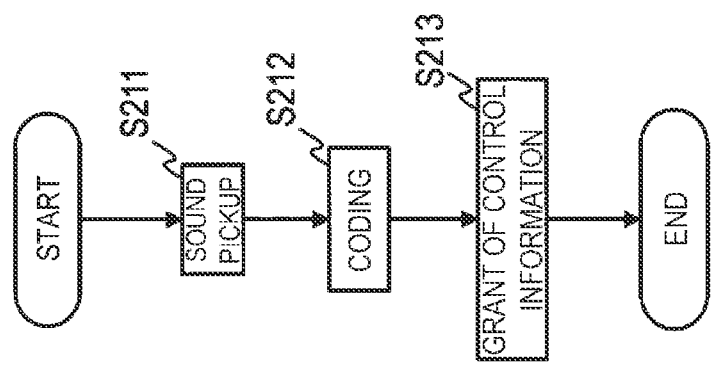
FIG. 10 is a flowchart of an example of a process of a sound signal fixed transmission side unit of the fixed communication terminal apparatus.
Figure 11:
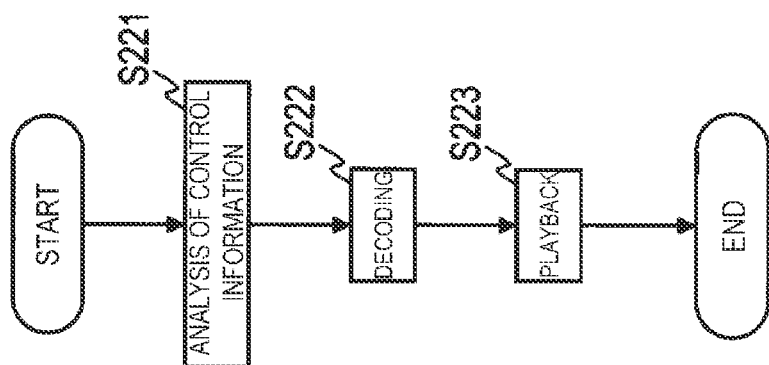
FIG. 11 is a flowchart of an example of a process of a sound signal fixed reception side unit of the fixed communication terminal apparatus.

The sound signal fixed transmission side unit 210-*m* of the fixed communication terminal apparatus 200-*m* performs the processes of step S211 to step S213 exemplified in FIG. 10 and the following description, and the sound signal fixed reception side unit 220-*m* of the fixed communication terminal apparatus 200-*m* performs the processes of step S221 to step S223 exemplified in FIG. 11 and the following description.

Sound Signal Fixed Transmission Side Unit 210-*m*

For example, for each predetermined time period of 20 ms, that is, for each frame, the sound signal fixed transmission side unit 210-*m* obtains a fixed terminal sending bit stream that is a bit stream including a code corresponding to digital sound signals of two channels, and outputs the bit stream to the fixed transmission path 400-*m*. Specifically, the sound signal fixed transmission side unit 210-*m* outputs a fixed terminal sending bit stream to the multipoint control unit 100 through the fixed transmission path 400-*m*.

Sound Pickup Section 211-*m*

The sound pickup section 211-*m* of the sound signal fixed transmission side unit 210-*m* includes two microphones and two AD conversion sections. The microphones and the AD conversion sections are associated with each other in a one-to-one relationship. The microphone picks up a sound generated in a spatial region of around the microphone, converts the sound into an analog electric signal, and outputs the analog electric signal to the AD conversion section. The AD conversion section converts an input analog electric signal into a digital sound signal as a PCM signal having a sampling frequency of 8 kHz, for example, and outputs the signal. Specifically, the sound pickup section 211-*m* outputs digital sound signals of two channels corresponding to sounds picked up by the two microphones, such as digital sound signals of a two-channel stereo of left and right channels, to the coding section 212-*m* of the sound signal fixed transmission side unit 210-*m* (step S211).

Coding Section 212-*m*

For each frame, the coding section 212-*m* of the sound signal fixed transmission side unit 210-*m* obtains a monaural code that is a code representing a mixed signal of digital sound signals of two channels input from the sound pickup section 211-*m*, and an extension code that can represent the input digital sound signals of two channels when the extension code is used in addition to the monaural code and the obtained monaural code and the obtained extension code are output to the control information granting section 213-*m* of the sound signal fixed transmission side unit 210-*m* (step S212). Specifically, the extension code obtained by the coding section 212-*m* is the code whereby any of the decoded digital sound signals of the two channels cannot be obtained when only the extension code is used, the code whereby both of the decoded digital sound signals of the two channels can be obtained when the code is used together with the monaural code, and the code that includes a code representing information corresponding to a difference between the input digital sound signals of two channels.

The mixed signal of digital sound signals of two channels is for example, a sequence obtained by adding together samples corresponding to digital sound signals of two channels, a sequence obtained by averaging samples corresponding to digital sound signals of two channels, a sequence obtained by adding together or averaging digital sound signals of two channels at least one of which is deformed or delayed, a sequence obtained by deforming the above-described sequences obtained through the adding or averaging, or the like, and is a signal corresponding to a sum of digital sound signals of two channels.

The code representing information corresponding to a difference between digital sound signals of two channels is a code obtained by coding information of a waveform representing a difference between digital sound signals of two channels, a code representing a feature parameter representing a difference between digital sound signals of two channels, or the like. Information of a waveform representing a difference between digital sound signals of two channels is, for example, a sequence of a value obtained by subtracting the sample corresponding to the digital sound signal of one channel from the sample of the digital sound signal of the other channel, a sequence of a value obtained by dividing, by 2, a value obtained by subtracting the sample corresponding to the digital sound signal of one channel from the sample of the digital sound signal of the other channel, a sequence obtained through the subtraction, or the subtraction and division, of digital sound signals of two channels at least one of which is deformed or delayed, a sequence obtained by deforming the sequence obtained through the subtraction, or the subtraction and division, a part of the above-described sequences. The feature parameter representing a difference between digital sound signals of two channels is one or more feature amount representing a relationship or a degree of difference between the signals of the channels, such as a difference in energy of each frequency band, a correlation of each frequency band, and a phase difference of each frequency band of the digital sound signals of two channels.

More specifically, for each frame, the coding section 212-*m* obtains a monaural code by coding a mixed signal of digital sound signals of two channels input from the sound pickup section 211-*m* by a predetermined first coding scheme, furthermore, obtains an extension code including the code representing information corresponding to a difference between the input digital sound signals of two channels, and outputs the obtained monaural code and the obtained extension code to the control information granting section 213-*m* of the sound signal fixed transmission side unit 210-*m*. Note that when coding the information corresponding to a difference between the input digital sound signals of two channels, the coding section 212-*m* obtains a code by coding the information corresponding to a difference between the input digital sound signals of two channels by a predetermined second coding scheme.

For example, the coding section 212-*m* obtains a monaural code by coding a sequence of an average value of samples corresponding to the input digital sound signals of two channels (i.e., a signal of the M channel of the known MS stereo) by the predetermined first coding scheme, and outputs the code, furthermore, with samples corresponding to the input digital sound signals of two channels, obtains a code by coding a sequence (a signal of the S channel of the known MS stereo) of a value obtained by dividing, by 2, a value obtained by subtracting the sample of the digital sound signal of the second channel from the sample of the digital sound signal of the first channel by the predetermined second coding scheme, and outputs the obtained code as an extension code.

As the first coding scheme, the same coding scheme is used for the coding sections 212-$m$ of all sound signal fixed transmission side units 210-$m$ and coding sections 312-$n$ of all sound signal mobile transmission side units 310-$n$. Thus, as the first coding scheme, it is necessary to use a coding scheme whose bit rate of the monaural code is equal to or smaller than the communication capacity of the mobile transmission path 500-$n$. In view of this, as the first coding scheme, a coding scheme of a phone band voice for a mobile phone, such as the 13.2 kbps mode of the 3GPP EVS standard described above, may be used for example.

The bit rate of the extension code is required to be equal to or smaller than a value obtained by subtracting the bit rate of the monaural code from the communication capacity of the fixed transmission path 400-$m$. Thus, when coding the information corresponding to a difference between the input digital sound signals of two channels, the same coding scheme, whose bit rate of the extension code is equal to or smaller than a value obtained by subtracting the bit rate of the monaural code from the communication capacity of the fixed transmission path 400-$m$, is required to be used for the coding sections 212-$m$ of all sound signal fixed transmission side units 210-$m$ as the second coding scheme. As the second coding scheme, a coding scheme capable of efficiently coding the information corresponding to the difference between the sound signals of the two channels, such as a difference signal of the sound signals of the two channels, may be used as long as the bit rate of the extension code satisfies the above-described condition, for example. Naturally, the same coding scheme as the first coding scheme may be used as the second coding scheme, and the 13.2 kbps mode of 3GPP EVS standard described above may be used as the second coding scheme, for example.

Note that the extension code may include a code for obtaining, on the decoding side, a decoded signal for a quantization error in the coding of a mixed signal of input digital sound signals of two channels by the first coding scheme. Specifically, the coding section 212-$m$ may obtain a code representing a quantization error in the coding of a mixed signal of the input digital sound signals of two channels by the first coding scheme, and the obtained code representing a quantization error and the above-described code representing information corresponding to the difference may be included in the extension code. Hereafter, a code representing a quantization error is referred to also as an error code, and a code representing information corresponding to a difference is also referred to as a difference code.

For example, the coding section 212-$m$ obtains a monaural code by coding a sequence of an average value of samples corresponding to the input digital sound signals of two channels (i.e., a signal of the M channel of the known MS stereo) by the predetermined first coding scheme, and outputs the code, obtains a provisional decoded digital sound signal obtained by decoding a monaural code by a first decoding scheme as a decoding method corresponding to the first coding method, and obtains a quantization error sequence by subtracting the sample corresponding to the provisional decoded digital sound signal from the sample of the mixed signal of the input digital sound signals of two channels, then, obtains an error code by coding the obtained quantization error sequence, and, with the samples corresponding to the input digital sound signals of two channels, obtains a difference code by coding a sequence (a signal of the S channel of the known MS stereo) of a value obtained by dividing, by 2, a value obtained by subtracting the sample of the digital sound signal of the second channel from the sample of the digital sound signal of the first channel, by the predetermined second coding scheme, and outputs an extension code including an error code and a difference code.

Control Information Granting Section 213-$m$

For each frame, the control information granting section 213-$m$ of the sound signal fixed transmission side unit 210-$m$ obtains a fixed terminal sending bit stream including an input monaural code and an extension code as codes representing a sound signal, and a control code that is a code representing code information representing a code included in a code string representing a sound signal and outputs the fixed terminal sending bit stream to the fixed transmission path 400-$m$ (step S213).

The code information represented by the control code included in the fixed terminal sending bit stream output by the control information granting section 213-$m$ is always "information representing that a code included in a code string representing a sound signal is a pair of a monaural code and an extension code". When an input bit stream is a fixed terminal sending bit stream, the multipoint control unit 100 described later can determine that a code representing a sound signal included in the bit stream is a pair of a monaural code and an extension code. Thus, when it is intended only for input to the multipoint control unit 100, it is not necessary to include, in the fixed terminal sending bit stream, the control code representing code information representing a code included in a code string representing a sound signal, and the sound signal fixed transmission side unit 210-$m$ may not include the control information granting section 213-$m$, so that the coding section 212-$m$ obtains and outputs a fixed terminal sending bit stream including a monaural code and an extension code as codes representing a sound signal. Note that the fixed terminal sending bit stream may include auxiliary information such as information that identifies the terminal apparatus that has obtained the fixed terminal sending bit stream, information that identifies the frame corresponding to the fixed terminal sending bit stream, information that identifies whether the frame includes a sound or not (e.g., whether the power of the digital sound signal of the frame is not smaller than a predetermined threshold), and information that identifies the position of each code included in a fixed terminal sending bit stream in the fixed terminal sending bit stream.

Sound Signal Fixed Reception Side Unit 220-$m$

For each frame, the sound signal fixed reception side unit 220-$m$ outputs a sound based on a bit stream for a fixed terminal input from the fixed transmission path 400-$m$. It should be noted that, depending on the input bit stream for a fixed terminal, the sound signal fixed reception side unit 220-$m$ may not output a sound. Note that the bit stream for a fixed terminal input from the fixed transmission path 400-$m$ is a bit stream for a fixed terminal output by the multipoint control unit 100 to the fixed communication terminal apparatus 200-$m$.

Control Information Analysis Section 221-$m$

For each frame, the control information analysis section 221-$m$ of the sound signal fixed reception side unit 220-$m$ outputs, to the decoding section 222-$m$ of the sound signal fixed reception side unit 220-$m$, code information represented by the control code included in an input bit stream for a fixed terminal, and each code included in a code string representing a sound signal included in the input bit stream for a fixed terminal (step S221). It should be noted that the control information analysis section 221-*m* does not output a code when the input bit stream for a fixed terminal does not include a code string representing a sound signal. That is, when the input bit stream for a fixed terminal includes a code string representing a sound signal, the control information analysis section 221-*m* outputs, for each frame, code information represented by the control code included in the input bit stream for a fixed terminal, and each code included in the code string representing a sound signal included in the input bit stream for a fixed terminal and outputs, when the input bit stream for a fixed terminal does not include a code string representing a sound signal, code information represented by the control code included in the input bit stream for a fixed terminal.

As described later in explanation of the multipoint control unit 100, the pair of code information representing the control code included in a bit stream for a fixed terminal and each code included in a code string representing a sound signal included in the bit stream for a fixed terminal is any of the following case A to case D. Thus, the control information analysis section 221-*m* outputs at least the code information of any of the case A to case D. The control information analysis section 221-*m* also outputs a code included in a code string representing a sound signal when the bit stream for a fixed terminal includes a code string representing the sound signal.

Case A: the code information is "information representing that a code included in a code string representing a sound signal is a pair of a monaural code and an extension code". The code included in the code string representing a sound signal is a pair of a monaural code and an extension code.

Case B: the code information is "information representing that a code included in a code string representing a sound signal is two monaural codes". The code included in the code string representing a sound signal is two monaural codes.

Case C: the code information is "information representing that a code included in a code string representing a sound signal is one monaural code". The code included in the code string representing a sound signal is one monaural code.

Case D: the code information is "information representing that there is no code string representing a sound signal". There is no code included in the code string representing a sound signal.

Decoding Section 222-*m*

For each frame, the decoding section 222-*m* of the sound signal fixed reception side unit 220-*m* obtains one or two decoded digital sound signals by decoding the input code, and outputs the one or two signals to the playback section 223-*m* of the sound signal fixed reception side unit 220-*m* when there is an input code on the basis of the input code information (step S222). More specifically, the decoding section 222-*m* performs a process of any of the following case A to case D for each frame.

Case A

When the input code information is "information representing that a code included in a code string representing a sound signal is a pair of a monaural code and an extension code", the decoding section 222-*m* obtains a provisional decoded digital sound signal by decoding the input monaural code by a predetermined first decoding scheme, and obtains decoded difference information from a code (difference code) representing information corresponding to a difference included in the input extension code, from the obtained provisional decoded digital sound signal and the obtained decoded difference information, obtains and outputs two decoded digital sound signals by regarding the provisional decoded digital sound signal as a mixed signal of the two decoded digital sound signals, and regarding the decoded difference information as information corresponding to a difference between the two decoded digital sound signals. Note that when the difference code is coded information, that is, when the difference code is obtained such that the information corresponding to a difference between the input digital sound signals of two channels is coded by the coding section 212-*m* of the corresponding sound signal fixed transmission side unit 210-*m* by the predetermined second coding scheme, the decoding section 222-*m* obtains decoded difference information by decoding the difference code included in the input extension code by a predetermined second decoding scheme.

For example, the decoding section 222-*m* obtains a first provisional decoded digital sound signal by decoding the input monaural code by the predetermined first decoding scheme, and obtains a second provisional decoded digital sound signal by decoding the difference code included in the input extension code by the predetermined second decoding scheme, and by taking the first provisional decoded digital sound signal as a signal of the M channel of the known MS stereo, and the second provisional decoded digital sound signal as a signal of the S channel of the known MS stereo, obtains and outputs a first decoded digital sound signal, that is a sequence of a value obtained by adding together the corresponding samples of the first provisional decoded digital sound signal and the second provisional decoded digital sound signal and a second decoded digital sound signal, that is a sequence of a value obtained by subtracting the corresponding sample of the second provisional decoded digital sound signal from the corresponding sample of the first provisional decoded digital sound signal.

Note that when the extension code includes a difference code and an error code, the decoding section 222-*m* obtains a provisional decoded digital sound signal by decoding the input monaural code by the predetermined first decoding scheme, obtains decoded error information from the error code included in the input extension code, and obtains decoded difference information from the difference code included in the input extension code, then, obtains and outputs two decoded digital sound signals from the obtained provisional decoded digital sound signal, the obtained decoded error information and the obtained decoded difference information, by regarding the provisional decoded digital sound signal as a mixed signal of the two decoded digital sound signals, regarding the decoded error information as information corresponding to an error of the provisional decoded digital sound signal, and regarding the decoded difference information as information corresponding to a difference between the two decoded digital sound signals.

In this case, for example, the decoding section 222-*m* obtains the first provisional decoded digital sound signal by decoding the input monaural code by the predetermined first decoding scheme, and obtains a third provisional decoded digital sound signal by decoding an error code included in the input extension code, and obtains the second provisional decoded digital sound signal by decoding the difference code included in the input extension code by the predetermined second decoding scheme, adds together the first provisional decoded digital sound signal and the third provisional decoded digital sound signal to obtain a fourth provisional decoded digital sound signal and, by taking the fourth provisional decoded digital sound signal as a signal of the M channel of the known MS stereo, and taking the second provisional decoded digital sound signal as a signal of the S channel of the known MS stereo, obtains the first decoded digital sound signal that is a sequence of a value obtained by adding together corresponding samples of the fourth provisional decoded digital sound signal and the second provisional decoded digital sound signal, and obtains and outputs the second decoded digital sound signal that is a sequence of a value obtained by subtracting the corresponding sample of the second provisional decoded digital sound signal from the corresponding sample of the fourth provisional decoded digital sound signal.

Case B

When the input code information is "information representing that a code included in a code string representing a sound signal is two monaural codes, the decoding section 222-$m$ obtains two decoded digital sound signals by decoding the input two monaural codes by the predetermined first decoding scheme and outputs the signals.

Case C

When the input code information is "information representing that a code included in a code string representing a sound signal is one monaural code", the decoding section 222-$m$ obtains one decoded digital sound signal by decoding the input monaural code by the predetermined first decoding scheme and outputs the signal. Note that in this case, as another decoded digital sound signal, the decoding section 222-$m$ obtains a decoded digital sound signal corresponding to silence, that is, a decoded digital sound signal in which the amplitudes of all samples are 0, and outputs the signal. In addition, in this case, the decoding section 222-$m$ may obtain, as another decoded digital sound signal, a decoded digital sound signal corresponding to a background noise signal generated based on a predetermined rule, such as a decoded digital sound signal of white noise with a small amplitude and a signal obtained by filtering the white noise, and output the signal.

Case D

When the information is "information representing that there is no code string representing a sound signal", the decoding section 222-$m$ does not perform decoding of codes and does not output a decoded digital sound signal. Note that in this case, the decoding section 222-$m$ may obtain and output one or two decoded digital sound signals corresponding to silence, that is, decoded digital sound signals in which the amplitudes of all samples are 0. In addition, in this case, the decoding section 222-$m$ may obtain and output one or two decoded digital sound signals corresponding to a background noise signal generated based on a predetermined rule, such as decoded digital sound signals of white noise with a small amplitude and signals obtained by filtering the white noise.

Note that as the first decoding scheme, the decoding section 222-$m$ uses a decoding scheme corresponding to the first coding scheme used in the coding section 212-$m$ of the sound signal fixed transmission side unit 210-$m$ and the coding section 312-$n$ of the sound signal mobile transmission side unit 310-$n$. In addition, as the second decoding scheme, the decoding section 222-$m$ uses a decoding scheme corresponding to the second coding scheme used in the coding section 212-$m$ of the sound signal fixed transmission side unit 210-$m$.

Playback Section 223-$m$

The playback section 223-$m$ of the sound signal fixed reception side unit 220-$m$ outputs a sound corresponding to one or two input decoded digital sound signals (step S223). When no decoded digital sound signal is input, no sound is output.

The playback section 223-$m$ includes two DA conversion sections and two speakers, for example. The DA conversion sections convert an input decoded digital sound signal into an analog electric signal and outputs the signal. The speaker generates a sound corresponding to an analog electric signal input from the DA conversion sections. The speakers may be provided in stereo headphones or stereo earphones. In this case, for example, when two decoded digital sound signals are input, the playback section 223-$m$ associates the DA conversion sections with the speakers in a one-to-one relationship, and generates sounds corresponding to the two decoded digital sound signals from the respective two speakers. In addition, when one decoded digital sound signal is input, the playback section 223-$m$ obtains one analog electric signal by using one DA conversion section, and generates a sound from one or two speakers by inputting the obtained one analog electric signal to the one or two speakers. Naturally, even when two decoded digital sound signals are input, two analog electric signals obtained by the DA conversion sections may be mixed and input to one or two speakers to generate a sound from the one or two speakers, or only one speaker may be provided. That is, the playback section 223-$m$ may have any configuration as long as sounds corresponding to all input decoded digital sound signals are generated.

Mobile Communication Terminal Apparatus 300-$n$

Figure 3:
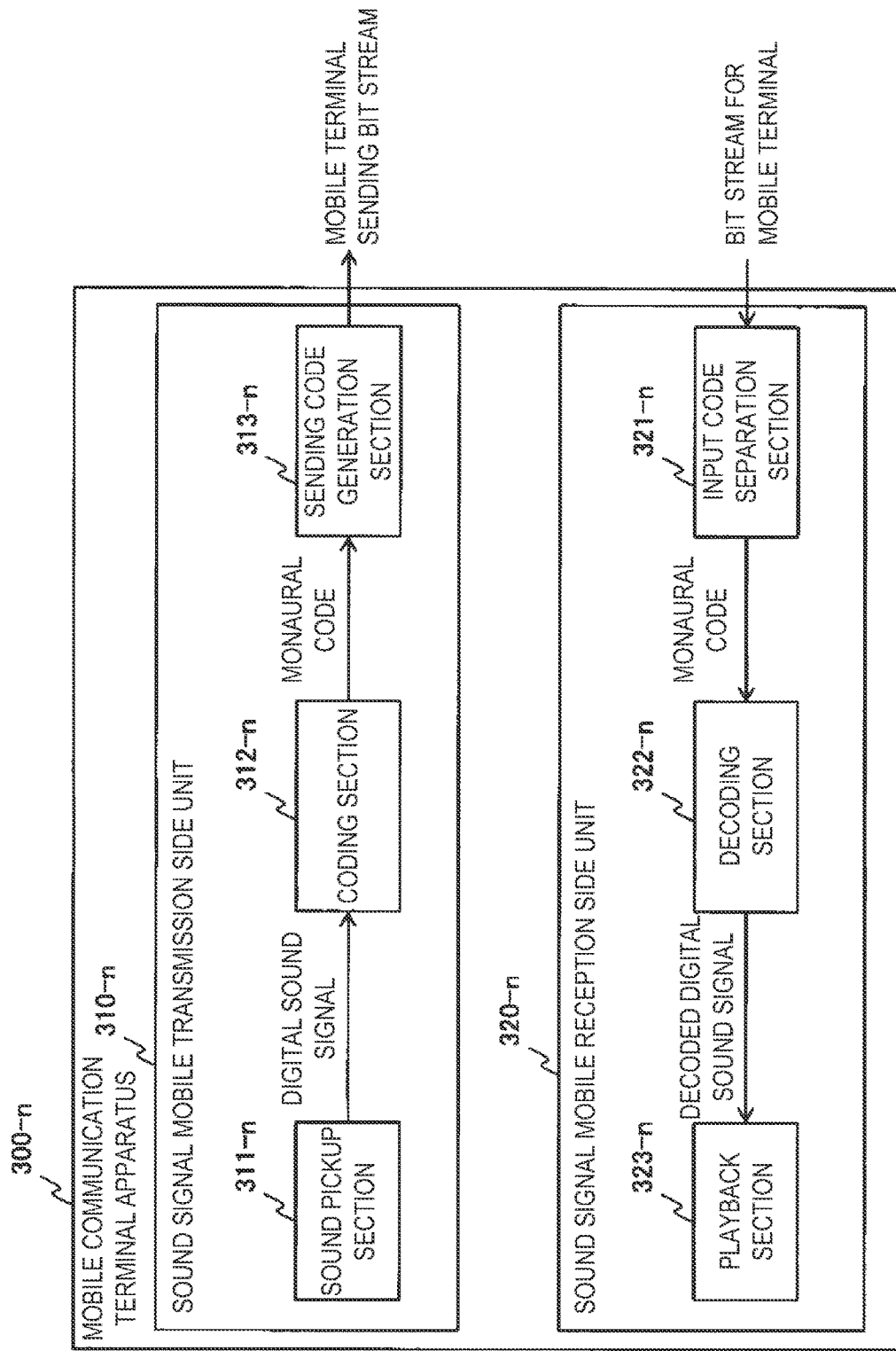
FIG. 3 is a block diagram illustrating an example of a mobile communication terminal apparatus.

Each mobile communication terminal apparatus 300-$n$ is, for example, a mobile phone, and includes the sound signal mobile transmission side unit 310-$n$ and a sound signal mobile reception side unit 320-$n$ as illustrated in FIG. 3. The sound signal mobile transmission side unit 310-$n$ includes a sound pickup section 311-$n$, the coding section 312-$n$ and a sending code generation section 313-$n$. The sound signal mobile reception side unit 320-$n$ includes an input code separation section 321-$n$, a decoding section 322-$n$ and a playback section 323-$n$.

Figure 12:
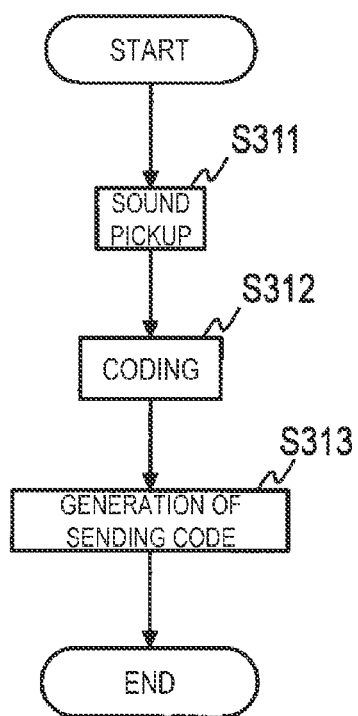
FIG. 12 is a flowchart of an example of a process of a sound signal fixed transmission side unit of the mobile communication terminal apparatus.
Figure 13:
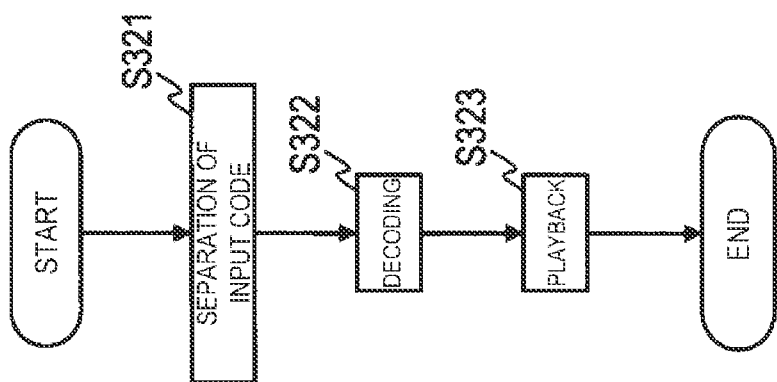
FIG. 13 is a flowchart of an example of a process of a sound signal fixed reception side unit of the mobile communication terminal apparatus.
Figure 14:
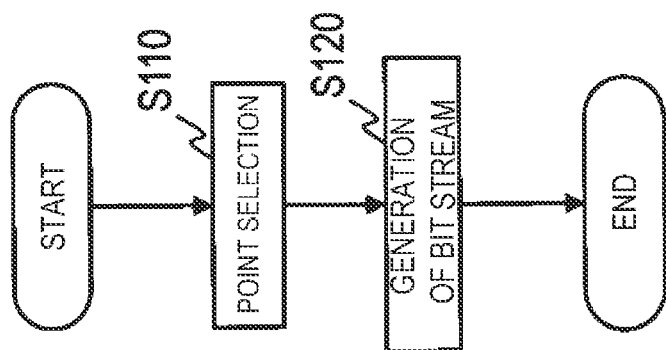
FIG. 14 is a flowchart of an example of a process of the multipoint control unit.

The sound signal mobile transmission side unit 310-$n$ of the mobile communication terminal apparatus 300-$n$ performs processes of step S311 to step S313 exemplified in FIG. 12 and the following description, and the sound signal mobile reception side unit 320-$m$ of the mobile communication terminal apparatus 300-$n$ performs processes of step S321 to step S323 exemplified in FIG. 13 and the following description.

Sound Signal Mobile Transmission Side Unit 310-$n$

For each frame, the sound signal mobile transmission side unit 310-$n$ obtains a mobile terminal sending bit stream that is a bit stream including a code corresponding to a digital sound signal of one channel, and outputs the mobile terminal sending bit stream to the mobile transmission path 500-$n$. That is, the sound signal mobile transmission side unit 310-$n$ outputs the mobile terminal sending bit stream to the multipoint control unit 100 through the mobile transmission path 500-$n$.

Sound Pickup Section 311-$n$

The sound pickup section 311-$n$ of the sound signal mobile transmission side unit 310-$n$ includes one microphone and one AD conversion section. The microphone picks up a sound generated in a spatial region of around the microphone, converts the sound into an analog electric signal, and outputs the analog electric signal to the AD conversion section. The AD conversion section converts an input analog electric signal into a digital sound signal as a PCM signal having a sampling frequency of 8 kHz, for example, and outputs the signal. That is, the sound pickup section 311-*n* outputs a digital sound signal of one channel corresponding to a sound picked up by one microphone to the coding section 312-*n* of the sound signal mobile transmission side unit 310-*n* (step S311).

Coding Section 312-*n*

For each frame, the coding section 312-*n* of the sound signal mobile transmission side unit 310-*n* obtains a monaural code by coding a digital sound signal of one channel input from the sound pickup section 311-*n* by the above-described first coding scheme, and outputs the obtained monaural code to the sending code generation section 313-*n* of the sound signal mobile transmission side unit 310-*n* (step S312).

Sending Code Generation Section 313-*n*

For each frame, the sending code generation section 313-*n* of the sound signal mobile transmission side unit 310-*n* obtains a mobile terminal sending bit stream including the input monaural code as a code representing a sound signal and outputs the mobile terminal sending bit stream to the mobile transmission path 500-*n* (step S313).

Note that the mobile terminal sending bit stream may include auxiliary information such as information that identifies the terminal apparatus that has obtained the mobile terminal sending bit stream, information that identifies the frame corresponding to the mobile terminal sending bit stream, information that identifies whether the frame includes a sound or not (e.g., whether the power of the digital sound signal of the frame is not smaller than a predetermined threshold), information that identifies the position of each code included in the mobile terminal sending bit stream in the mobile terminal sending bit stream, or may include a control code representing code information representing a code included in a code string representing a sound signal. In addition, the sound signal mobile transmission side unit 310-*n* may not include the sending code generation section 313-*n*, so that the coding section 312-*n* obtains and outputs a mobile terminal sending bit stream including a monaural code as a code representing a sound signal.

Sound Signal Mobile Reception Side Unit 320-*n*

For each frame, the sound signal mobile reception side unit 320-*n* outputs a sound based on a bit stream for a mobile terminal input from the mobile transmission path 500-*n*. It should be noted that, depending on the input bit stream for a mobile terminal, the sound signal mobile reception side unit 320-*n* may not output a sound. Note that the bit stream for a mobile terminal input from the mobile transmission path 500-*n* is a bit stream for a mobile terminal output by the multipoint control unit 100 to the mobile communication terminal apparatus 300-*n*.

Input Code Separation Section 321-*n*

For each frame, the input code separation section 321-*n* of the sound signal mobile reception side unit 320-*n* outputs, to the decoding section 322-*n* of the sound signal mobile reception side unit 320-*n*, one monaural code included in a code string representing a sound signal included in the input bit stream for a mobile terminal (step S321). It should be noted that, the input code separation section 321-*n* does not output a code when a code string representing a sound signal is not included in the input bit stream for a mobile terminal That is, for each frame, the input code separation section 321-*n* outputs one monaural code included in a code string representing a sound signal included in the input bit stream for a mobile terminal when a code string representing a sound signal is included in the input bit stream for a mobile terminal, whereas the input code separation section 321-*n* does not output a code when a code string representing a sound signal is not included in the input bit stream for a mobile terminal.

Decoding Section 322-*n*

For each frame, when a monaural code is input, the decoding section 322-*n* of the sound signal mobile reception side unit 320-*n* obtains one decoded digital sound signal by decoding input one monaural code by the above-described first decoding scheme, and outputs the signal to the playback section 323-*n* of the sound signal mobile reception side unit 320-*n* (step S322). When no code is input, the decoding section 322-*n* does not output the decoded digital sound signal. It should be noted that, when no code is input, the decoding section 322-*n* may obtain and output a decoded digital sound signal corresponding to silence, that is, a decoded digital sound signal in which the amplitudes of all samples are 0. In addition, when no code is input, the decoding section 322-*n* may obtain and output a decoded digital sound signal corresponding to a background noise signal generated based on a predetermined rule, such as a decoded digital sound signal of white noise with a small amplitude and a signal obtained by filtering the white noise.

Playback Section 323-*n*

The playback section 323-*n* of the sound signal mobile reception side unit 320-*n* outputs a sound corresponding to one input decoded digital sound signal (step S323). When no decoded digital sound signal is input, no sound is output.

The playback section 323-*n* includes one or more DA conversion sections and one or more speakers, for example. The DA conversion sections convert an input decoded digital sound signal into an analog electric signal and outputs the signal. The speaker generates a sound corresponding to an analog electric signal input from the DA conversion sections. The speaker may be provided in a headset, headphones or earphones. When a plurality of speakers such as stereo headphones and stereo earphones is used as the speaker, an analog electric signal output by one DA conversion section may be input to the plurality of speakers, or a plurality of analog electric signals obtained by inputting one input decoded digital sound signal to a plurality of DA conversion sections may be input to the plurality of speakers. That is, the playback section 323-*n* may have any configuration as long as a sound corresponding to one input decoded digital sound signal is generated.

Multipoint Control Unit 100

Figure 4:
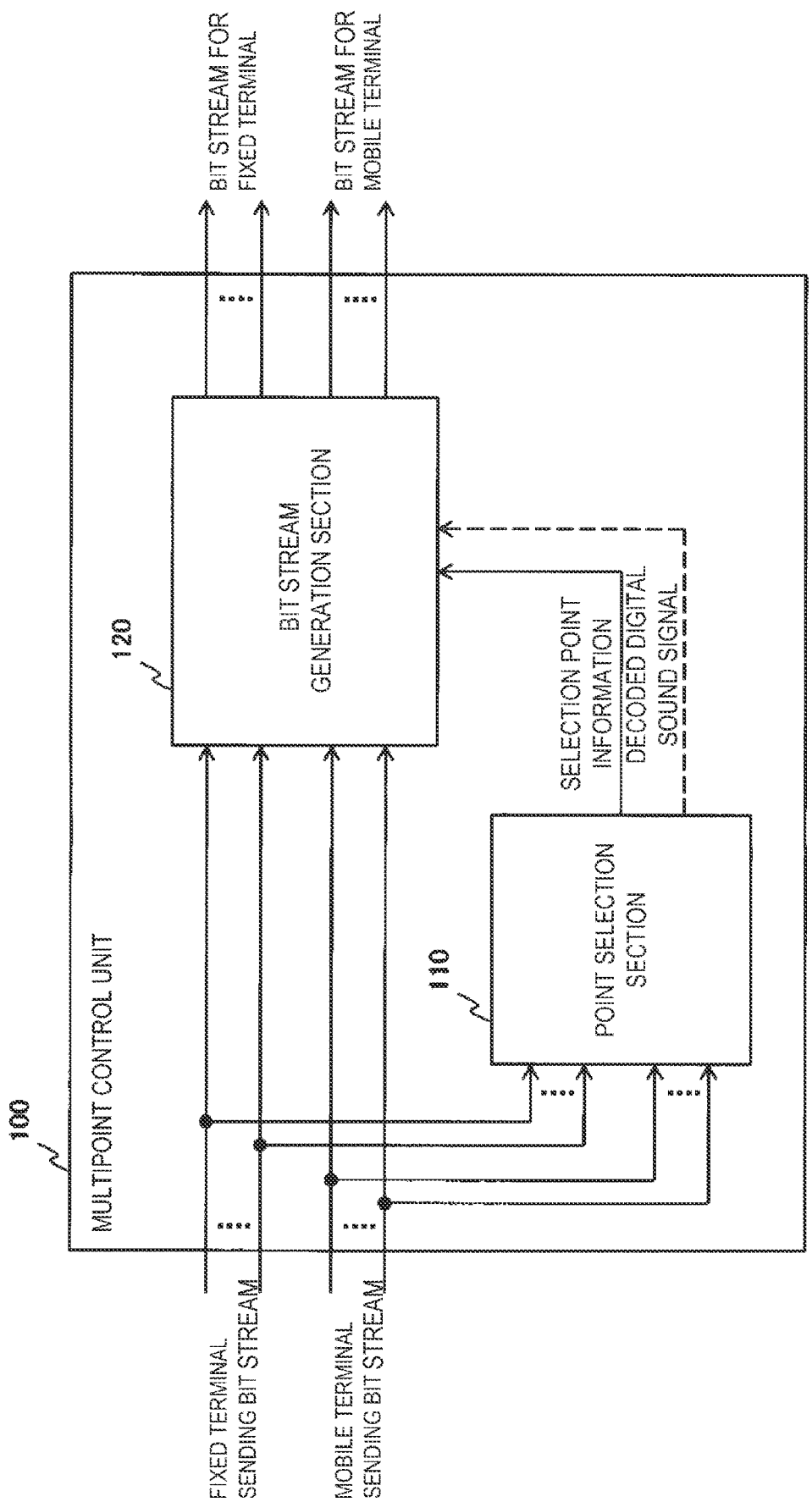
FIG. 4 is a block diagram illustrating an example of a multipoint control unit.

As illustrated in FIG. 4, the multipoint control unit 100 includes a point selection section 110 and a bit stream generation section 120. The multipoint control unit 100 performs the process of step S110 to step S120 exemplified in FIG. 12 and the following description. A fixed terminal sending bit stream from the fixed transmission path 400-*m* and a mobile terminal sending bit stream from the mobile transmission path 500-*n* are input to the multipoint control unit 100. That is, a fixed terminal sending bit stream output by the sound signal fixed transmission side unit 210-*m* of each fixed communication terminal apparatus 200-*m* is input through each fixed transmission path 400-*m*, and a mobile terminal sending bit stream output by the sound signal mobile transmission side unit 310-*n* of each mobile communication terminal apparatus 300-*n* is input through each mobile transmission path 500-*n*. For each frame, the multipoint control unit 100 generates a bit stream for a fixed terminal for each fixed communication terminal apparatus 200-*m* and outputs the bit stream to each fixed transmission path 400-*m*, and, the multipoint control unit 100 generates a bit stream for a mobile terminal for each mobile communication terminal apparatus 300-*n* and outputs the bit stream to each mobile transmission path 500-$n$, on the basis of the input fixed terminal sending bit stream and the input mobile terminal sending bit stream. Specifically, for each frame, the multipoint control unit 100 generates a bit stream for a fixed terminal for the sound signal fixed reception side unit 220-$m$ of each fixed communication terminal apparatus 200-$m$ and outputs the bit stream to the sound signal fixed reception side unit 220-$m$ of each fixed communication terminal apparatus 200-$m$ through each fixed transmission path 400-$m$, generates a bit stream for a mobile terminal for the sound signal mobile reception side unit 320-$n$ of each mobile communication terminal apparatus 300-$n$ and outputs the bit stream to the sound signal mobile reception side unit 320-$n$ of each mobile communication terminal apparatus 300-$n$ through each mobile transmission path 500-$n$.

Point Selection Section 110

A fixed terminal sending bit stream input to the multipoint control unit 100 and a mobile terminal sending bit stream input to the multipoint control unit 100 are input to the point selection section 110. For each frame, the point selection section 110 selects one or two points from all points connected to the multipoint control unit 100, that is, M fixed communication terminal apparatuses and N mobile communication terminal apparatuses, and outputs information that can identify the selected point (step S110). The point selection section 110 may select the points based on a selection criterion set in advance, and as the selection criterion, a criterion that can select highly important points may be set in advance so that the point selection section 110 can execute the selection.

For example, when the power of the sound signal is used as the selection criterion, the point selection section 110 obtains, for each frame, information representing the powers of M+N decoded digital sound signals from the monaural codes included in M fixed terminal sending bit streams and the monaural codes included in N mobile terminal sending bit streams input thereto, obtains information that can identify the terminal apparatus corresponding to a decoded digital sound signal having a largest power in the M+N decoded digital sound signals, and information that can identify the terminal apparatus corresponding to a decoded digital sound signal whose power is second largest and is equal to or greater than a predetermined threshold in the M+N decoded digital sound signals, and outputs the information to the bit stream generation section 120 as selection point information. The threshold is, for example, a value greater than an anticipated power of a decoded digital sound signal that includes only background noise, and may be set in advance through an experiment and the like. Thus, the point selection section 110 selects one or two points from all points connected to the multipoint control unit 100, and outputs information that can identify the selected point.

For example, when the terminal apparatus having a decoded digital sound signal of a largest power is the fixed communication terminal apparatus 200-1, the point selection section 110 may obtain information "Fix-1" as the information that can identify the fixed communication terminal apparatus 200-1. In addition, for example, when the terminal apparatus whose power of the decoded digital sound signal is second largest and is equal to or greater than a predetermined threshold is the mobile communication terminal apparatus 300-2, the point selection section 110 may obtain information "Mobile-2" as the information that can identify the mobile communication terminal apparatus 300-2. Specifically, the point selection section 110 outputs information of any of following case 1 to case 5 as selection point information.

Case 1: "Fix-$M_1$" (note that $M_1$ is any one of integers from 1 to M)

Case 2: "Mobile-$N_1$" (note that $N_1$ is any one of integers from 1 to N)

Case 3: a pair of "Fix-$M_1$" and "Fix-$M_2$" (note that $M_1$ is any one of integers from 1 to M, and $M_2$ is any one of integers from 1 to M and is different from $M_1$)

Case 4: a pair of "Fix-$M_1$" and "Mobile-$N_1$" (note that $M_1$ is any one of integers from 1 to M, and $N_1$ is any one of integers from 1 to N)

Case 5: a pair of "Mobile-$N_1$" and "Mobile-$N_2$" (note that $N_1$ is any one of integers from 1 to N, and $N_2$ is any one of integers from 1 to N and is different from $N_1$)

Note that the information representing the power of each decoded digital sound signal may be obtained by a known method from each of the input M fixed terminal sending bit streams and N mobile terminal sending bit streams. For example, for each frame, the point selection section 110 may obtain M+N decoded digital sound signals by decoding the monaural codes included in the M fixed terminal sending bit streams and the monaural codes included in the N mobile terminal sending bit streams input thereto by the above-described first decoding scheme, and calculate the power of each of the obtained M+N decoded digital sound signals to obtain the information representing the power. In addition, for example, for each frame, the point selection section 110 may obtain, as the information representing the power, the value represented by each of the code representing the power included in the monaural code included in the M fixed terminal sending bit streams and the code representing the power included in the monaural code included in the N mobile terminal sending bit streams.

In addition, when each of the fixed terminal sending bit stream and the mobile terminal sending bit stream includes information that identifies whether the frame includes a sound or not, the point selection section 110 may select one or two terminal apparatuses by a known method using the input M+N pieces of information that identify whether a sound is included or not for each frame, so as to output information that can identify the selected terminal apparatus as the selection point information to the bit stream generation section 120.

Bit Stream Generation Section 120

The fixed terminal sending bit stream input to the multipoint control unit 100, the mobile terminal sending bit stream input to the multipoint control unit 100, and the selection point information output by the point selection section 110 are input to the bit stream generation section 120. For each frame, the bit stream generation section 120 uses the input fixed terminal sending bit stream and the input mobile terminal sending bit stream on the basis of the input selection point information to generate a bit stream for a fixed terminal to be output to each fixed communication terminal apparatus 200-$m$ and a bit stream for a mobile terminal to be output to each mobile communication terminal apparatus 300-$n$ and output the bit streams (step S120). More specifically, the bit stream generation section 120 performs any of the following processes for each frame.

Case where Selection Point Information is Information of Case 1

Figure 5:
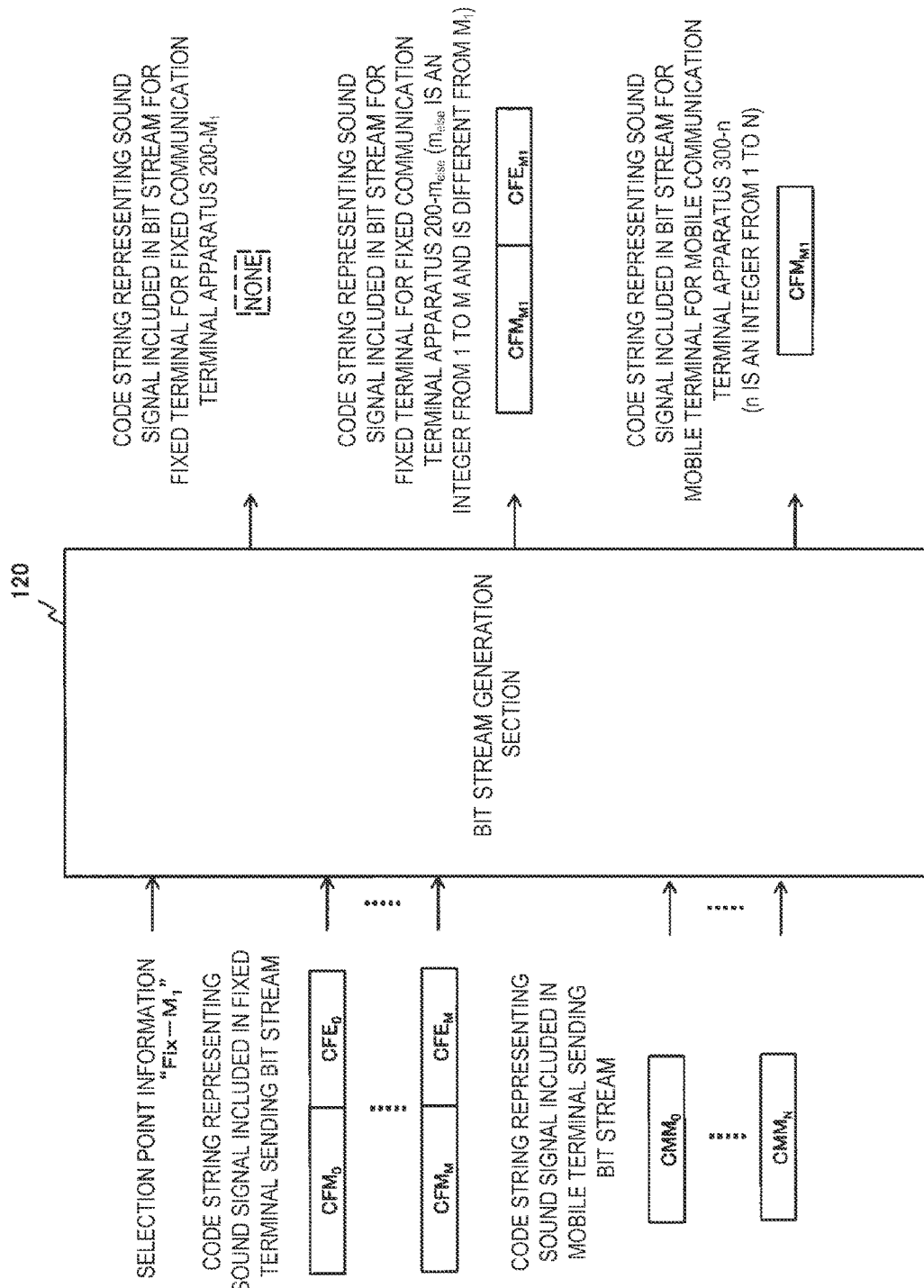
FIG. 5 is a diagram schematically illustrating an example of a code string representing a sound signal when selection point information is information of case 1.

When the selection point information is information named "Fix-$M_1$", the bit stream generation section 120 generates bit streams of three patterns described below. FIG. 5 schematically illustrates code strings representing sound signals of this case.

Note that in FIG. 5 and FIGS. 6 to 9 described later, a monaural code and an extension code included in a fixed terminal sending bit stream output by the fixed communication terminal apparatus 200-$m$ are indicated as CFM$_m$ and CFE$_m$, respectively, and a monaural code included in a mobile terminal sending bit stream output by the mobile communication terminal apparatus 300-$n$ is indicated as CMM$_n$.

The bit stream of the first pattern output by the bit stream generation section 120 is a bit stream for a fixed terminal that does not include a code string representing a sound signal. If the selection point information is "Fix-M$_1$", then the sound required at each terminal apparatus is only the sound picked up by the fixed communication terminal apparatus 200-M$_1$. However, because the sound picked up by the fixed communication terminal apparatus 200-M$_1$ is present in the fixed communication terminal apparatus 200-M$_1$, the multipoint control unit 100 is not required to transmit the sound picked up by the fixed communication terminal apparatus 200-M$_1$ to the fixed communication terminal apparatus 200-M$_1$. Thus, the bit stream generation section 120 generates a bit stream for a fixed terminal that does not include a code string representing a sound signal and outputs the bit stream to the fixed communication terminal apparatus 200-M$_1$. More specifically, the bit stream generation section 120 generates a bit stream for a fixed terminal that does not include a code string representing a sound signal, but includes a control code representing that the code information is "information representing that there is no code string representing a sound signal", and outputs the bit stream to a fixed transmission path 400-M$_1$ to which the fixed communication terminal apparatus 200-M$_1$ is connected.

The bit stream of the second pattern output by the bit stream generation section 120 is a bit stream for a fixed terminal including, as codes representing a sound signal, a monaural code CFM$_{M1}$ and an extension code CFE$_{M1}$ included in the fixed terminal sending bit stream output by the fixed communication terminal apparatus 200-M$_1$. As described above, if the selection point information is "Fix-M$_1$", then the sound required at each terminal apparatus is only the sound picked up by the fixed communication terminal apparatus 200-M$_1$. Thus, in each fixed communication terminal apparatus 200-$m_{else}$ ($m_{else}$ is an integer from 1 to M and is different from M$_1$) other than the fixed communication terminal apparatus 200-M$_1$, it is preferable to output the sound picked up by the fixed communication terminal apparatus 200-M$_1$ with the highest possible quality. Thus, the bit stream generation section 120 generates a bit stream for a fixed terminal including, as codes representing a sound signal, the monaural code CFM$_{M1}$ and the extension code CFE$_{M1}$ included in the fixed terminal sending bit stream output by the fixed communication terminal apparatus 200-M$_1$, and outputs the bit stream to each fixed communication terminal apparatus 200-$m_{else}$. More specifically, the bit stream generation section 120 generates a bit stream for a fixed terminal including the monaural code CFM$_{M1}$ and the extension code CFE$_{M1}$ included in the fixed terminal sending bit stream output by the fixed communication terminal apparatus 200-M$_1$ as codes representing a sound signal, and including a control code representing that the code information is "information representing that a code included in a code string representing a sound signal is a pair of a monaural code and an extension code" and outputs the bit stream for a fixed terminal to each fixed transmission path 400-$m_{else}$ to which each fixed communication terminal apparatus 200-$m_{else}$ is connected. That is, the code string representing a sound signal included in the bit stream for a fixed terminal for the fixed communication terminal apparatus 200-$m_{else}$ includes the monaural code CFM$_{M1}$ and the extension code CFE$_{M1}$ as codes representing a sound signal.

The bit stream of the third pattern output by the bit stream generation section 120 is a bit stream for a mobile terminal including, as a code representing a sound signal, the monaural code CFM$_{M1}$ included in the fixed terminal sending bit stream output by the fixed communication terminal apparatus 200-M$_1$. As described above, if the selection point information is "Fix-M$_1$", then the sound required at each terminal apparatus is only the sound picked up by the fixed communication terminal apparatus 200-M$_1$. Thus, in each mobile communication terminal apparatus 300-$n$ (n is an integer from 1 to N), it is preferable to output the sound picked up by the fixed communication terminal apparatus 200-M$_1$ with the highest possible quality. However, the communication capacity of the mobile transmission path 500-$n$ between the multipoint control unit 100 and each mobile communication terminal apparatus 300-$n$ is not large enough to send also the extension code in addition to one monaural code. Thus, the bit stream generation section 120 generates a bit stream for a mobile terminal including, as a code representing a sound signal, the monaural code CFM$_{M1}$ included in the fixed terminal sending bit stream output by the fixed communication terminal apparatus 200-M$_1$, and outputs the bit stream to each mobile communication terminal apparatus 300-$n$, that is, to each mobile transmission path 500-$n$ to which each mobile communication terminal apparatus 300-$n$ is connected. That is, the code string representing a sound signal included in the bit stream for a mobile terminal for the mobile communication terminal apparatus 300-$n$ includes the monaural code CFM$_{M1}$ as a code representing a sound signal.

Case where Selection Point Information is Information of Case 2

Figure 6:
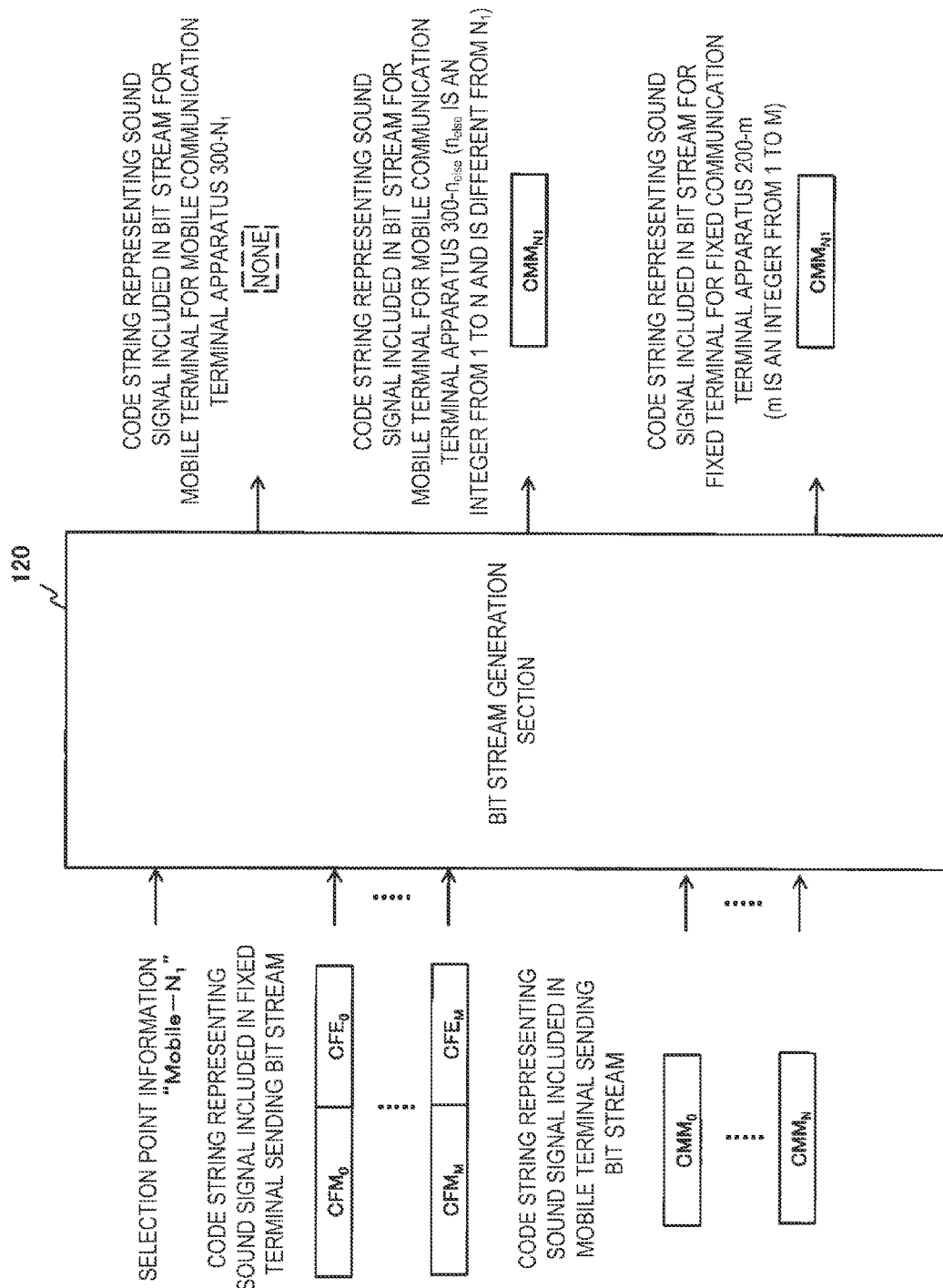
FIG. 6 is a diagram schematically illustrating an example of a code string representing a sound signal when selection point information is information of case 2.

When the selection point information is information named "Mobile-N1", the bit stream generation section 120 generates and outputs bit streams of three patterns described below. FIG. 6 schematically illustrates code strings representing sound signals of this case.

The bit stream of the first pattern output by the bit stream generation section 120 is a bit stream for a mobile terminal that does not include a code string representing a sound signal. If the selection point information is "Mobile-N$_1$", then the sound required at each terminal apparatus is only the sound picked up by the mobile communication terminal apparatus 300-N$_1$. However, because the sound picked up by the mobile communication terminal apparatus 300-N$_1$ is present in the mobile communication terminal apparatus 300-N$_1$, the multipoint control unit 100 is not required to transmit the sound picked up by the mobile communication terminal apparatus 300-N$_1$ to the mobile communication terminal apparatus 300-N$_1$. Thus, the bit stream generation section 120 generates a bit stream for a mobile terminal that does not include a code string representing a sound signal and outputs the bit stream to the mobile communication terminal apparatus 300-N$_1$, that is, to the mobile transmission path 500-N$_1$ to which the mobile communication terminal apparatus 300-N$_1$ is connected.

The bit stream of the second pattern output by the bit stream generation section 120 is a bit stream for a mobile terminal including, as a code representing a sound signal, a monaural code CMM$_{N1}$ included in the mobile terminal sending bit stream output by the mobile communication terminal apparatus 300-N$_1$. As described above, if the selection point information is "Mobile-N$_1$", then the sound required at each terminal apparatus is only the sound picked up by the mobile communication terminal apparatus 300-N$_1$.

Thus, in each mobile communication terminal apparatus $300\text{-}n_{else}$ ($n_{else}$ is an integer from 1 to N and is different from $N_1$) other than the mobile communication terminal apparatus $300\text{-}N_1$, it is preferable to output the sound picked up by the mobile communication terminal apparatus $300\text{-}N_1$ with the highest possible quality. Thus, the bit stream generation section 120 generates a bit stream for a mobile terminal including, as a code representing a sound signal, the monaural code $CMM_{N1}$ included in the mobile terminal sending bit stream output by the mobile communication terminal apparatus $300\text{-}N_1$, and outputs the bit stream to each mobile communication terminal apparatus $300\text{-}n_{else}$, that is, to each mobile transmission path $500\text{-}n_{else}$ to which each mobile communication terminal apparatus $300\text{-}n_{else}$ is connected. That is, the code string representing a sound signal included in the bit stream for a mobile terminal for the mobile communication terminal apparatus $300\text{-}n_{else}$ includes the monaural code $CMM_{N1}$ as a code representing a sound signal.

The bit stream of the third pattern output by the bit stream generation section 120 is a bit stream for a fixed terminal including, as a code representing a sound signal, the monaural code $CMM_{N1}$ included in the mobile terminal sending bit stream output by the mobile communication terminal apparatus $300\text{-}N_1$. As described above, if the selection point information is "Mobile-$N_1$", then the sound required at each terminal apparatus is only the sound picked up by the mobile communication terminal apparatus $300\text{-}N_1$. Thus, in each fixed communication terminal apparatus $200\text{-}m$ (m is an integer from 1 to M), it is preferable to output the sound picked up by the mobile communication terminal apparatus $300\text{-}N_1$ with the highest possible quality. It should be noted that, the code representing a sound signal included in the mobile terminal sending bit stream output by the mobile communication terminal apparatus $300\text{-}N_1$ is only the monaural code $CMM_{N1}$, and no extension code is included in the mobile terminal sending bit stream output by the mobile communication terminal apparatus $300\text{-}N_1$. Thus, the bit stream generation section 120 generates a bit stream for a fixed terminal including, as a code representing a sound signal, the monaural code $CMM_{N1}$ included in the mobile terminal sending bit stream output by the mobile communication terminal apparatus $300\text{-}N_1$, and outputs the bit stream to each fixed communication terminal apparatus $200\text{-}m$. More specifically, the bit stream generation section 120 generates a bit stream for a fixed terminal including the monaural code $CMM_{N1}$ included in the mobile terminal sending bit stream output by the mobile communication terminal apparatus $300\text{-}N_1$ as a code representing a sound signal, and including a control code representing that the code information is "information representing that a code included in a code string representing a sound signal is one monaural code" and outputs the bit stream to each fixed transmission path $400\text{-}m$ to which each fixed communication terminal apparatus $200\text{-}m$ is connected.

That is, the code string representing a sound signal included in the bit stream for a fixed terminal for the fixed communication terminal apparatus $200\text{-}m$ includes the monaural code $CMM_{N1}$ as a code representing a sound signal.

Case where Selection Point Information is Information of Case 3

Figure 7:
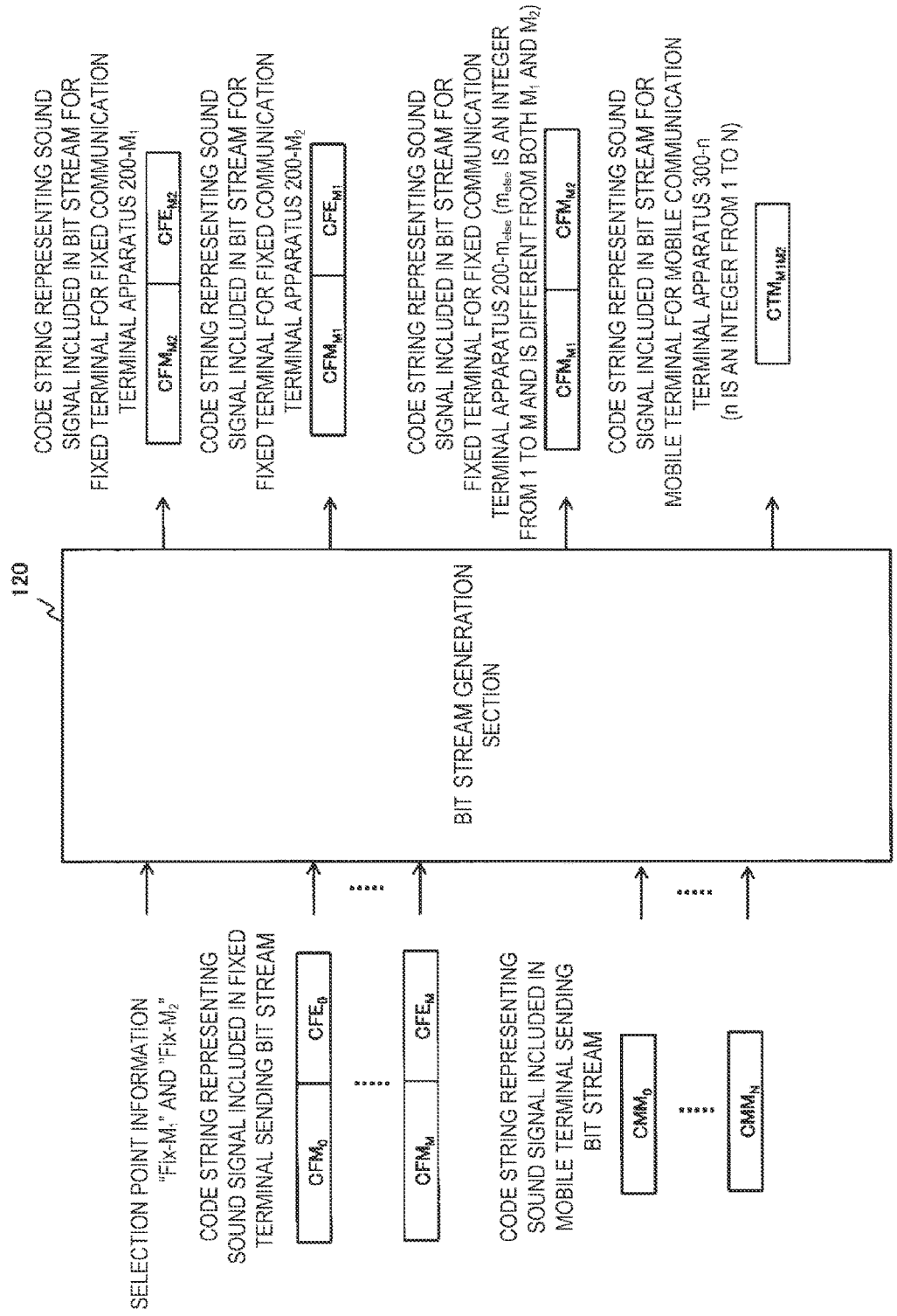
FIG. 7 is a diagram schematically illustrating an example of a code string representing a sound signal when selection point information is information of case 3.

When the selection point information is information named "Fix-$M_1$" and "Fix-$M_2$", the bit stream generation section 120 generates the bit stream of the four patterns described below. It should be noted that, in the case of M=2, it is not necessary to generate and output the bit stream of the third pattern described below, and therefore the bit streams of three patterns of the first, second and fourth patterns described below are generated and output. FIG. 7 schematically illustrates code strings representing sound signals of this case.

The bit stream of the first pattern output by the bit stream generation section 120 is a bit stream for a fixed terminal including, as codes representing a sound signal, the monaural code $CFM_{M2}$ and the extension code $CFE_{M2}$ included in the fixed terminal sending bit stream output by the fixed communication terminal apparatus $200\text{-}M_2$. If the selection point information is "Fix-$M_1$" and "Fix-$M_2$", then the sound required at each terminal apparatus is the sound picked up by the fixed communication terminal apparatus $200\text{-}M_1$ and the sound picked up by the fixed communication terminal apparatus $200\text{-}M_2$. However, because the sound picked up by the fixed communication terminal apparatus $200\text{-}M_1$ is present in the fixed communication terminal apparatus $200\text{-}M_1$, the multipoint control unit 100 is not required to transmit the sound picked up by the fixed communication terminal apparatus $200\text{-}M_1$ to the fixed communication terminal apparatus $200\text{-}M_1$. Thus, in the fixed communication terminal apparatus $200\text{-}M_1$, it is preferable to output the sound picked up by the fixed communication terminal apparatus $200\text{-}M_2$ with the highest possible quality. Thus, the bit stream generation section 120 generates a bit stream for a fixed terminal including, as codes representing a sound signal, the monaural code $CFM_{M2}$ and the extension code $CFE_{M2}$ included in the fixed terminal sending bit stream output by the fixed communication terminal apparatus $200\text{-}M_2$, and outputs the bit stream to the fixed communication terminal apparatus $200\text{-}M_1$. More specifically, the bit stream generation section 120 generates a bit stream for a fixed terminal including the monaural code $CFM_{M2}$ and the extension code $CFE_{M2}$ included in the fixed terminal sending bit stream output by the fixed communication terminal apparatus $200\text{-}M_2$ as codes representing a sound signal, and a control code representing that the code information is "information representing that a code included in a code string representing a sound signal is a pair of a monaural code and an extension code", and outputs the bit stream to the fixed transmission path $400\text{-}M_1$ to which the fixed communication terminal apparatus $200\text{-}M_1$ is connected. That is, the code string representing a sound signal included in the bit stream for a fixed terminal for the fixed communication terminal apparatus $200\text{-}M_1$ includes the monaural code $CFM_{M2}$ and the extension code $CFE_{M2}$ as codes representing a sound signal.

The bit stream of the second pattern output by the bit stream generation section 120 is a bit stream for a fixed terminal including, as codes representing a sound signal, a monaural code $CFM_{M1}$ and an extension code $CFE_{M1}$ included in the fixed terminal sending bit stream output by the fixed communication terminal apparatus $200\text{-}M_1$. As described above, if the selection point information is "Fix-$M_1$" and "Fix-$M_2$", then the sound required at each terminal apparatus is the sound picked up by the fixed communication terminal apparatus $200\text{-}M_1$ and the sound picked up by the fixed communication terminal apparatus $200\text{-}M_2$. However, because the sound picked up by the fixed communication terminal apparatus $200\text{-}M_2$ is present in the fixed communication terminal apparatus $200\text{-}M_2$, the multipoint control unit 100 is not required to transmit the sound picked up by the fixed communication terminal apparatus $200\text{-}M_2$ to the fixed communication terminal apparatus $200\text{-}M_2$. Thus, in the fixed communication terminal apparatus $200\text{-}M_2$, it is preferable to output the sound picked up by the fixed communication terminal apparatus $200\text{-}M_1$ with the highest possible quality. Thus, the bit stream generation section 120 generates a bit stream for a fixed terminal including, as codes representing a sound signal, the monaural code $CFM_{M1}$ and the extension code $CFE_{M1}$ included in the fixed terminal sending bit stream output by the fixed communication terminal apparatus 200-$M_1$, and outputs the bit stream to the fixed communication terminal apparatus 200-$M_2$. More specifically, the bit stream generation section 120 generates a bit stream for a fixed terminal including the monaural code $CFM_{M1}$ and the extension code $CFE_{M1}$ included in the fixed terminal sending bit stream output by the fixed communication terminal apparatus 200-$M_1$ as codes representing a sound signal and including a control code representing that the code information is "information representing that a code included in a code string representing a sound signal is a pair of a monaural code and an extension code" and outputs the bit stream to the fixed transmission path 400-$M_2$ to which the fixed communication terminal apparatus 200-$M_2$ is connected. That is, the code string representing a sound signal included in the bit stream for a fixed terminal for the fixed communication terminal apparatus 200-$M_2$ includes the monaural code $CFM_{M1}$ and the extension code $CFE_{M1}$ as codes representing a sound signal.

The bit stream of the third pattern output by the bit stream generation section 120 is a bit stream for a fixed terminal including, as codes representing a sound signal, the monaural code $CFM_{M1}$ included in the fixed terminal sending bit stream output by the fixed communication terminal apparatus 200-$M_1$ and the monaural code $CFM_{M2}$ included in the fixed terminal sending bit stream output by the fixed communication terminal apparatus 200-$M_2$. As described above, if the selection point information is "Fix-$M_1$" and "Fix-$M_2$", then the sound required at each terminal apparatus is the sound picked up by the fixed communication terminal apparatus 200-$M_1$ and the sound picked up by the fixed communication terminal apparatus 200-$M_2$. Thus, in each fixed communication terminal apparatus 200-$m_{else}$ ($m_{else}$ is an integer from 1 to M and is different from both $M_1$ and $M_2$) that is neither the fixed communication terminal apparatus 200-$M_1$ nor the fixed communication terminal apparatus 200-$M_2$, it is preferable to output the sound picked up by the fixed communication terminal apparatus 200-$M_1$ and the sound picked up by the fixed communication terminal apparatus 200-$M_2$ with the highest possible quality. However, the communication capacity of the fixed transmission path 400-$m_{else}$ between the multipoint control unit 100 and each fixed communication terminal apparatus 200-$m_{else}$ is not large enough to send also an extension code in addition to two monaural codes. In addition, if the monaural code $CFM_{M1}$ and the extension code $CFE_{M1}$ included in the fixed terminal sending bit stream output by the fixed communication terminal apparatus 200-$M_1$ are decoded to obtain decoded digital sound signals of two channels, and the monaural code $CFM_{M2}$ and the extension code $CFE_{M2}$ included in the fixed terminal sending bit stream output by the fixed communication terminal apparatus 200-$M_2$ are decoded to obtain decoded digital sound signals of two channels, and, the two decoded digital sound signals are mixed for each of the two channels and then coded to obtain a monaural code and an extension code, a pair of a monaural code and an extension code can fall within the communication capacity of the fixed transmission path 400-$m_{else}$ between the multipoint control unit 100 and each fixed communication terminal apparatus 200-$M_{else}$, but the sound quality is degraded because paired coding and decoding are connected in tandem. Thus, the bit stream generation section 120 generates a bit stream for a fixed terminal including, as codes representing a sound signal, the monaural code $CFM_{M1}$ included in the fixed terminal sending bit stream output by the fixed communication terminal apparatus 200-$M_1$ and the monaural code $CFM_{M2}$ included in the fixed terminal sending bit stream output by the fixed communication terminal apparatus 200-$M_2$, and outputs the bit stream to the fixed communication terminal apparatus 200-$m_{else}$. More specifically, the bit stream generation section 120 generates a bit stream for a fixed terminal including the monaural code $CFM_{M1}$ included in the fixed terminal sending bit stream output by the fixed communication terminal apparatus 200-$M_1$ and the monaural code $CFM_{M2}$ included in the fixed terminal sending bit stream output by the fixed communication terminal apparatus 200-$M_2$ as codes representing a sound signal, and including a control code representing that the code information is "information representing that a code included in a code string representing a sound signal is two monaural codes" and outputs the bit stream to each fixed transmission path 400-$m_{else}$ to which each fixed communication terminal apparatus 200-$m_{else}$ is connected. That is, the code string representing a sound signal included in the bit stream for a fixed terminal for the fixed communication terminal apparatus 200-$M_{else}$ includes the monaural code $CFM_{M1}$ and the monaural code $CFM_{M2}$ as codes representing a sound signal.

The bit stream of the fourth pattern output by the bit stream generation section 120 is a bit stream for a mobile terminal including, as a code representing a sound signal, a monaural code $CTM_{M1M2}$ obtained by mixing, and then coding, decoded digital sound signals obtained by decoding each of the monaural code $CFM_{M1}$ included in a fixed terminal sending bit stream output by the fixed communication terminal apparatus 200-$M_1$ and the monaural code $CFM_{M2}$ included in a fixed terminal sending bit stream output by the fixed communication terminal apparatus 200-$M_2$. As described above, if the selection point information is "Fix-$M_1$" and "Fix-$M_2$", then the sound required at each terminal apparatus is the sound picked up by the fixed communication terminal apparatus 200-$M_1$ and the sound picked up by the fixed communication terminal apparatus 200-$M_2$. Thus, in each mobile communication terminal apparatus 300-$n$ (n is an integer from 1 to N), it is preferable to output the sound picked up by the fixed communication terminal apparatus 200-$M_1$ and the sound picked up by the fixed communication terminal apparatus 200-$M_2$ with the highest possible quality. However, the communication capacity of the mobile transmission path 500-$n$ between the multipoint control unit 100 and each mobile communication terminal apparatus 300-$n$ is not large enough to send two monaural codes. As such, in each mobile communication terminal apparatus 300-$n$, it is desirable at least to output the sound picked up by the fixed communication terminal apparatus 200-$M_1$ and the sound picked up by the fixed communication terminal apparatus 200-$M_2$, even if the sound quality is degraded. Thus, the bit stream generation section 120 generates a bit stream for a mobile terminal including, as a code representing a sound signal, the monaural code $CTM_{M1M2}$ obtained from a mixed digital sound signal that is obtained at the bit stream generation section 120 by obtaining the first decoded digital sound signal by decoding the monaural code $CFM_{M1}$ included in the fixed terminal sending bit stream output by the fixed communication terminal apparatus 200-$M_1$, by obtaining the second decoded digital sound signal by decoding the monaural code $CFM_{M2}$ included in the fixed terminal sending bit stream output by the fixed communication terminal apparatus 200-

$M_2$, by obtaining a mixed digital sound signal by mixing the first decoded digital sound signal and the second decoded digital sound signal by obtaining a sequence of an average value of the samples corresponding to the first decoded digital sound signal and the second decoded digital sound signal or the like, and by obtaining the monaural code $CTM_{M1M2}$ by coding the mixed digital sound signal by the above-described first coding scheme and outputs the bit stream to each mobile communication terminal apparatus 300-$n$.

That is, the bit stream is output to each mobile transmission path 500-$n$ to which each mobile communication terminal apparatus 300-$n$ is connected. That is, the code string representing a sound signal included in the bit stream for a mobile terminal for the mobile communication terminal apparatus 300-$n$ includes, as a code representing a sound signal, the monaural code $CTM_{M1M2}$.

Note that when the point selection section 110 has obtained M+N decoded digital sound signals, the first decoded digital sound signal and the second decoded digital signal are the same as two of the M+N decoded digital sound signals obtained by the point selection section 110, and therefore, instead of obtaining a decoded digital sound signal by decoding a monaural code at the bit stream generation section 120, the point selection section 110 may output, to the bit stream generation section 120, the decoded digital sound signal obtained by the point selection section 110 so that the bit stream generation section 120 uses the decoded digital sound signal input from the point selection section 110.

Case where Selection Point Information is Information of Case 4

Figure 8:
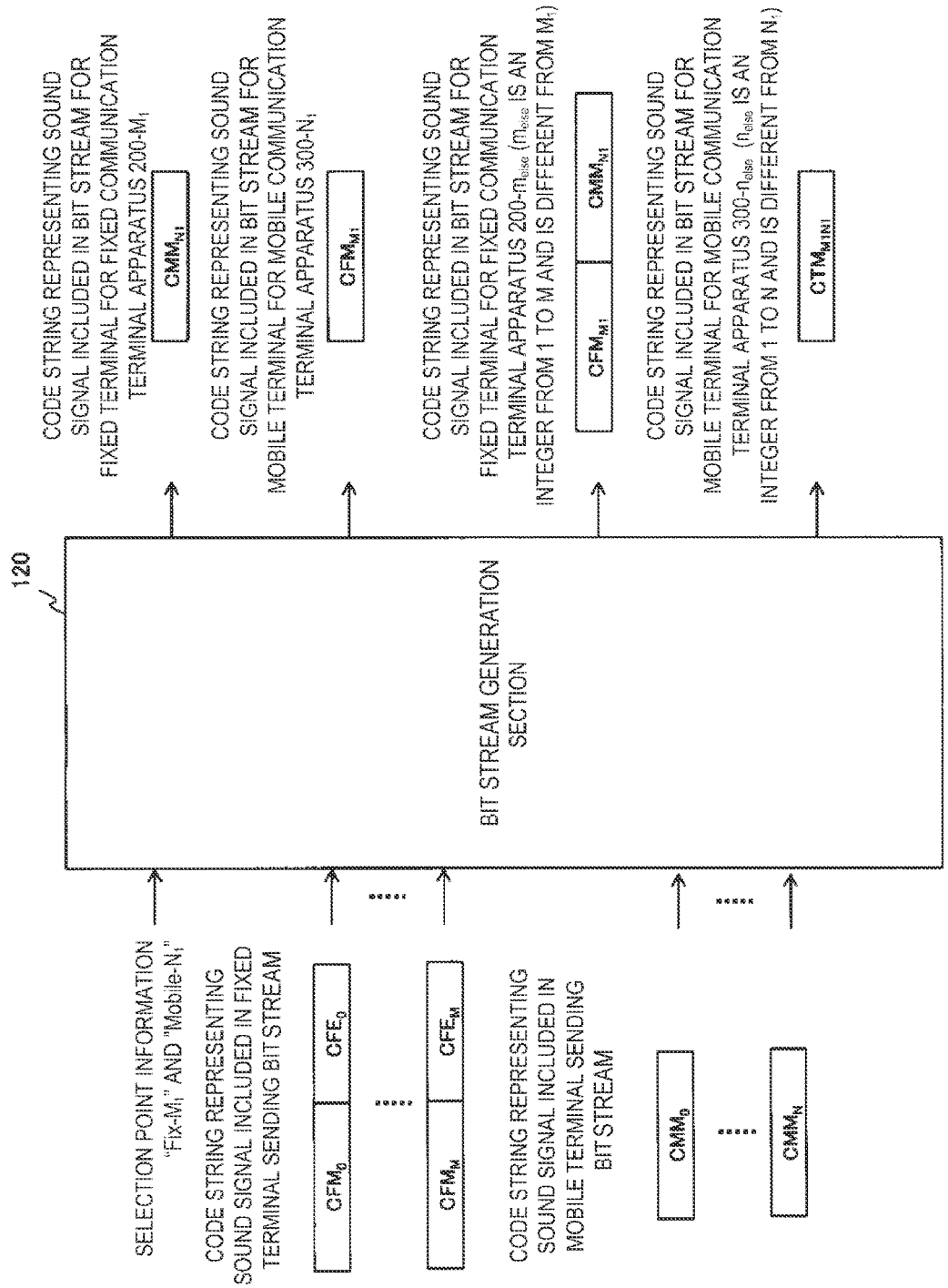
FIG. 8 is a diagram schematically illustrating an example of a code string representing a sound signal when selection point information is information of case 4.

When the selection point information is information named "Fix-$M_1$" and "Mobile-$N_1$", the bit stream generation section 120 generates the bit stream of the four patterns described below. FIG. 8 schematically illustrates code strings representing sound signals of this case.

The bit stream of the first pattern output by the bit stream generation section 120 is a fixed terminal bit stream including, as a code representing a sound signal, the monaural code $CMM_{N1}$ included in the mobile terminal sending bit stream output by the mobile communication terminal apparatus 300-$N_1$. If the selection point information is "Fix-$M_1$" and "Mobile-$N_1$", then the sound required at each terminal apparatus is the sound picked up by the fixed communication terminal apparatus 200-$M_1$ and the sound picked up by the mobile communication terminal apparatus 300-$N_1$. However, because the sound picked up by the fixed communication terminal apparatus 200-$M_1$ is present in the fixed communication terminal apparatus 200-$M_1$, the multipoint control unit 100 is not required to transmit the sound picked up by the fixed communication terminal apparatus 200-$M_1$ to the fixed communication terminal apparatus 200-$M_1$. Thus, in the fixed communication terminal apparatus 200-$M_1$, it is preferable to output the sound picked up by the mobile communication terminal apparatus 300-$N_1$ with the highest possible quality. It should be noted that, the code representing a sound signal included in the mobile terminal sending bit stream output by the mobile communication terminal apparatus 300-$N_1$ is only the monaural code $CMM_{N1}$, and no extension code is included in the mobile terminal sending bit stream output by the mobile communication terminal apparatus 300-$N_1$. Thus, the bit stream generation section 120 generates a bit stream for a fixed terminal including, as a code representing a sound signal, the monaural code $CMM_{N1}$ included in the mobile terminal sending bit stream output by the mobile communication terminal apparatus 300-$N_1$, and outputs the bit stream to the fixed communication terminal apparatus 200-$M_1$. More specifically, the bit stream generation section 120 generates a bit stream for a fixed terminal including the monaural code $CMM_{N1}$ included in the mobile terminal sending bit stream output by the mobile communication terminal apparatus 300-$N_1$ as a code representing a sound signal, and including a control code representing that the code information is "information representing that a code included in a code string representing a sound signal is one monaural code" and outputs the bit stream to the fixed transmission path 400-$M_1$ to which the fixed communication terminal apparatus 200-$M_1$ is connected. That is, the code string representing a sound signal included in the bit stream for a fixed terminal for the fixed communication terminal apparatus 200-$M_1$ includes the monaural code $CMM_{N1}$ as a code representing a sound signal.

The bit stream of the second pattern output by the bit stream generation section 120 is a bit stream for a mobile terminal including, as a code representing a sound signal, the monaural code $CFM_{M1}$ included in the fixed terminal sending bit stream output by the fixed communication terminal apparatus 200-$M_1$. As described above, if the selection point information is "Fix-$M_1$" and "Mobile-$N_1$", then the sound required at each terminal apparatus is the sound picked up by the fixed communication terminal apparatus 200-$M_1$ and the sound picked up by the mobile communication terminal apparatus 300-$N_1$. However, because the sound picked up by the mobile communication terminal apparatus 300-$N_1$ is present in the mobile communication terminal apparatus 300-$N_1$, the multipoint control unit 100 is not required to transmit the sound picked up by the mobile communication terminal apparatus 300-$N_1$ to the mobile communication terminal apparatus 300-$N_1$. Thus, in the mobile communication terminal apparatus 300-$N_1$, it is preferable to output the sound picked up by the fixed communication terminal apparatus 200-$M_1$ with the highest possible quality. However, the communication capacity of the mobile transmission path 500-$N_1$ between the multipoint control unit 100 and the mobile communication terminal apparatus 300-$N_1$ is not large enough to send also the extension code in addition to one monaural code. Thus, the bit stream generation section 120 generates a bit stream for a mobile terminal including, as a code representing a sound signal, the monaural code $CFM_{M1}$ included in the fixed terminal sending bit stream output by the fixed communication terminal apparatus 200-$M_1$, and outputs the bit stream to the mobile communication terminal apparatus 300-$N_1$, that is, to the mobile transmission path 500-$N_1$ to which the mobile communication terminal apparatus 300-$N_1$ is connected. That is, the code string representing a sound signal included in the bit stream for a mobile terminal for the mobile communication terminal apparatus 300-$N_1$ includes the monaural code $CFM_{M1}$ as a code representing a sound signal.

The bit stream of the third pattern output by the bit stream generation section 120 is a bit stream for a fixed terminal including, as codes representing a sound signal, the monaural code $CFM_{M1}$ included in the fixed terminal sending bit stream output by the fixed communication terminal apparatus 200-$M_1$ and the monaural code $CMM_{N1}$ included in the mobile terminal sending bit stream output by the mobile communication terminal apparatus 300-$N_1$. As described above, if the selection point information is "Fix-$M_1$" and "Mobile-$N_1$", then the sound required at each terminal apparatus is the sound picked up by the fixed communication terminal apparatus 200-$M_1$ and the sound picked up by the mobile communication terminal apparatus 300-$N_1$.

Thus, in each fixed communication terminal apparatus 200-$m_{else}$ ($m_{else}$ is an integer from 1 to M and is different from $M_1$) other than the fixed communication terminal apparatus 200-$M_1$, it is preferable to output the sound picked up by the fixed communication terminal apparatus 200-$M_1$ and the sound picked up by the mobile communication terminal apparatus 300-$N_1$ with the highest possible quality. It should be noted that, the communication capacity of the fixed transmission path 400-$m_{else}$ between the multipoint control unit 100 and each fixed communication terminal apparatus 200-$m_{else}$ is not large enough to send also an extension code in addition to two monaural codes.

In addition, decoded digital sound signals of two channels are obtained by decoding the monaural code $CFM_{M1}$ and the extension code $CFE_{M1}$ included in the fixed terminal sending bit stream output by the fixed communication terminal apparatus 200-$M_1$, and a monaural decoded digital sound signal is obtained by decoding the monaural code $CMM_{N1}$ included in the mobile terminal sending bit stream output by the mobile communication terminal apparatus 300-$N_1$. Then, after the decoded digital sound signal and the monaural decoded sound digital sound signal of one of the two channels are mixed, and the decoded digital sound signal and the monaural decoded sound digital sound signal of the other channel of the two channels are mixed, if coding is performed to obtain a monaural code and an extension code, a pair of a monaural code and an extension code can fall within the communication capacity of the fixed transmission path 400-$m_{else}$ between the multipoint control unit 100 and each fixed communication terminal apparatus 200-$m_{else}$, but the sound quality is degraded because paired coding and decoding are connected in tandem.

Thus, the bit stream generation section 120 generates a bit stream for a fixed terminal including, as codes representing a sound signal, the monaural code $CFM_{M1}$ included in the fixed terminal sending bit stream output by the fixed communication terminal apparatus 200-$M_1$ and the monaural code $CMM_{N1}$ included in the mobile terminal sending bit stream output by the mobile communication terminal apparatus 300-$N_1$, and outputs the bit stream to the fixed communication terminal apparatus 200-$m_{else}$. More specifically, the bit stream generation section 120 generates a bit stream for a fixed terminal including the monaural code $CFM_{M1}$ included in the fixed terminal sending bit stream output by the fixed communication terminal apparatus 200-$M_1$ and the monaural code $CMM_{N1}$ included in the mobile terminal sending bit stream output by the mobile communication terminal apparatus 300-$N_1$ as codes representing a sound signal, and including a control code representing that the code information is "information representing that a code included in a code string representing a sound signal is two monaural codes" and outputs the bit stream to each fixed transmission path 400-$m_{else}$ to which each fixed communication terminal apparatus 200-$m_{else}$ is connected.

That is, the code string representing a sound signal included in the bit stream for a fixed terminal for the fixed communication terminal apparatus 200-$m_{else}$ includes, as codes representing a sound signal, the monaural code $CFM_{M1}$ and the monaural code $CMM_{N1}$.

The bit stream of the fourth pattern output by the bit stream generation section 120 is a bit stream for a mobile terminal including, as a code representing a sound signal, a monaural code $CTM_{M1N1}$ obtained by mixing, and then coding, a decoded digital sound signals obtained by decoding each of the monaural code $CFM_{M1}$ included in a fixed terminal sending bit stream output by the fixed communication terminal apparatus 200-$M_1$ and the monaural code $CMM_{N1}$ included in a mobile terminal sending bit stream output by the mobile communication terminal apparatus 300-$N_1$. As described above, if the selection point information is "Fix-$M_1$" and "Mobile-$N_1$", then the sound required at each terminal apparatus is the sound picked up by the fixed communication terminal apparatus 200-$M_1$ and the sound picked up by the mobile communication terminal apparatus 300-$N_1$. Thus, in each mobile communication terminal apparatus 300-$n_{else}$ ($n_{else}$ is an integer from 1 to N and is different from $N_1$) other than the mobile communication terminal apparatus 300-$N_1$, it is preferable to output the sound picked up by the fixed communication terminal apparatus 200-$M_1$ and the sound picked up by the mobile communication terminal apparatus 300-$N_1$ with the highest possible quality. However, the communication capacity of the mobile transmission path 500-$n_{else}$ between the multipoint control unit 100 and each mobile communication terminal apparatus 300-$n_{else}$ is not large enough to send two monaural codes. As such, in each mobile communication terminal apparatus 300-$n_{else}$, it is desirable at least to output the sound picked up by the fixed communication terminal apparatus 200-$M_1$ and the sound picked up by the mobile communication terminal apparatus 300-$N_1$ even if the sound quality is degraded.

Thus, the bit stream generation section 120 obtains the first decoded digital sound signal by decoding the monaural code $CFM_{M1}$ included in the fixed terminal sending bit stream output by the fixed communication terminal apparatus 200-$M_1$, and obtains the second decoded digital sound signal by decoding the monaural code $CMM_{N1}$ included in the mobile terminal sending bit stream output by the mobile communication terminal apparatus 300-$N_1$, obtains a mixed digital sound signal by mixing the first decoded digital sound signal and the second decoded digital sound signal by obtaining a sequence of an average value of the samples corresponding to the first decoded digital sound signal and the second decoded digital sound signal or the like, obtains the monaural code $CTM_{M1N1}$ by coding the mixed digital sound signal by the above-described first coding scheme, generates a bit stream for a mobile terminal including the monaural code $CTM_{M1N1}$ obtained from the mixed digital sound signal as a code representing the sound signal and outputs the bit stream for a mobile terminal to the mobile communication terminal apparatus 300-$n_{else}$, that is, to each mobile transmission path 500-$n_{else}$ to which each communication terminal apparatus 300-$n_{else}$ is connected. That is, the code string representing a sound signal included in the bit stream for a mobile terminal for the mobile communication terminal apparatus 300-$n_{else}$ includes, as a code representing a sound signal, the monaural code $CTM_{M1N1}$.

Note that when the point selection section 110 has obtained M+N decoded digital sound signals, the first decoded digital sound signal and the second decoded digital signal are the same as two of the M+N decoded digital sound signals obtained by the point selection section 110, and therefore, instead of obtaining a decoded digital sound signal by decoding a monaural code at the bit stream generation section 120, the point selection section 110 may output, to the bit stream generation section 120, the decoded digital sound signal obtained by the point selection section 110 so that the bit stream generation section 120 uses the decoded digital sound signal input from the point selection section 110.

Case where Selection Point Information is Information of Case 5

Figure 9:
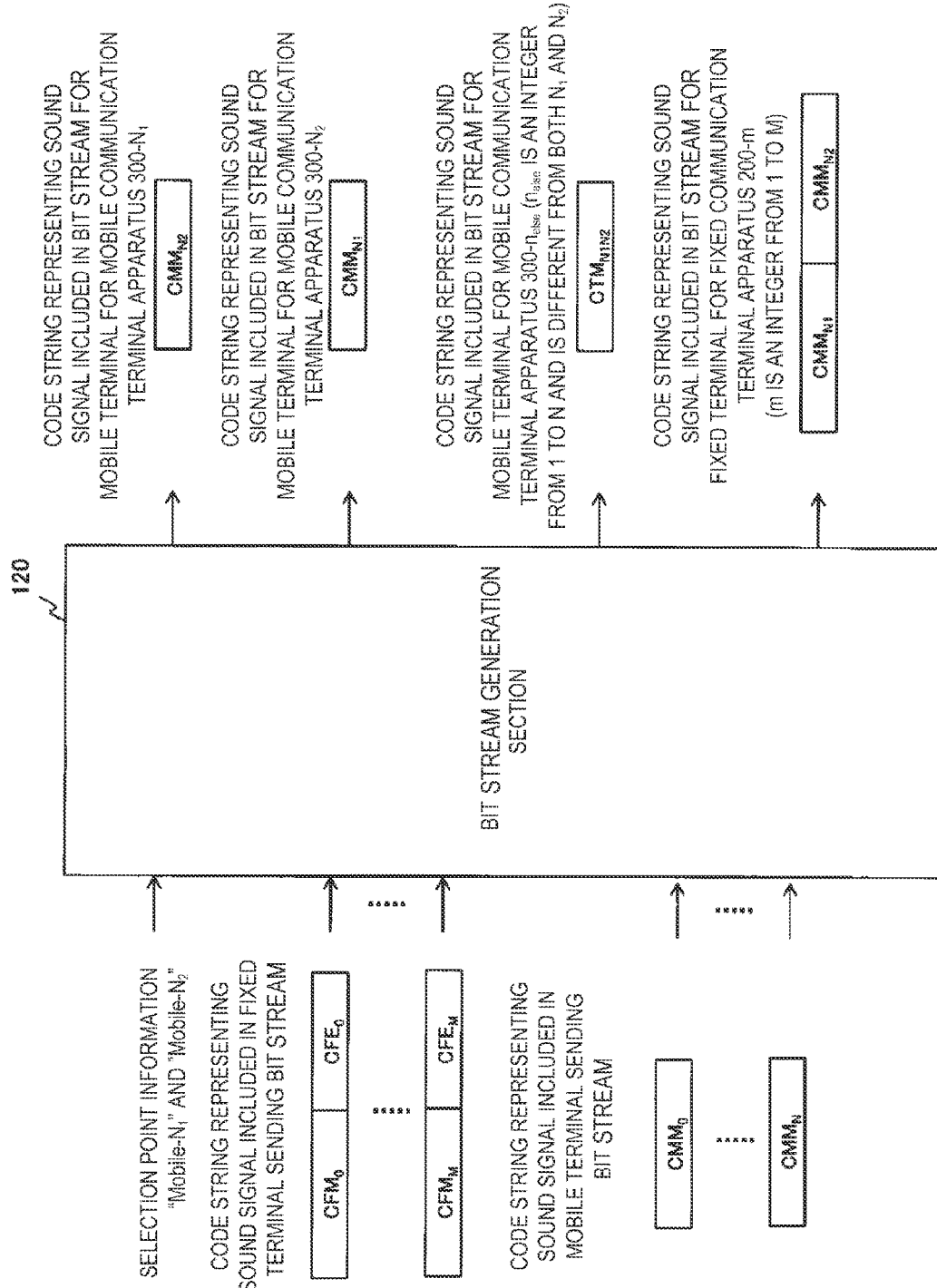
FIG. 9 is a diagram schematically illustrating an example of a code string representing a sound signal when selection point information is information of case 5.

When the selection point information is information named "Mobile-$N_1$" and "Mobile-$N_2$", the bit stream generation section 120 generates the bit stream of any of the four patterns described below. It should be noted that, in the case of N=2, it is not necessary to generate and output the bit stream of the third pattern described below, and therefore bit streams of three patterns of the first, second and fourth patterns described below are generated. FIG. 9 schematically illustrates code strings representing sound signals of this case.

The bit stream of the first pattern output by the bit stream generation section 120 is a bit stream for a mobile terminal including, as a code representing a sound signal, a monaural code $CMM_{N2}$ included in the mobile terminal sending bit stream output by the mobile communication terminal apparatus 300-$N_2$. If the selection point information is "Mobile-$N_1$" and "Mobile-$N_2$", then the sound required at each terminal apparatus is the sound picked up by the mobile communication terminal apparatus 300-$N_1$ and the sound picked up by the mobile communication terminal apparatus 300-$N_2$. However, because the sound picked up by the mobile communication terminal apparatus 300-$N_1$ is present in the mobile communication terminal apparatus 300-$N_1$, the multipoint control unit 100 is not required to transmit the sound picked up by the mobile communication terminal apparatus 300-$N_1$ to the mobile communication terminal apparatus 300-$N_1$. Thus, in the mobile communication terminal apparatus 300-$N_1$, it is preferable to output the sound picked up by the mobile communication terminal apparatus 300-$N_2$ with the highest possible quality. Thus, the bit stream generation section 120 generates a bit stream for a mobile terminal including, as a code representing a sound signal, the monaural code $CMM_{N2}$ included in the mobile terminal sending bit stream output by the mobile communication terminal apparatus 300-$N_2$, and outputs the bit stream to the mobile communication terminal apparatus 300-$N_1$, that is, to the mobile transmission path 500-$N_1$ to which the mobile communication terminal apparatus 300-$N_1$ is connected. That is, the code string representing a sound signal included in the bit stream for a mobile terminal for the mobile communication terminal apparatus 300-$N_1$ includes, as a code representing a sound signal, the monaural code $CMM_{N2}$.

The bit stream of the second pattern output by the bit stream generation section 120 is a bit stream for a mobile terminal including, as a code representing a sound signal, a monaural code $CMM_{N1}$ included in the mobile terminal sending bit stream output by the mobile communication terminal apparatus 300-$N_1$. As described above, if the selection point information is "Mobile-$N_1$" and "Mobile-$N_2$", then the sound required at each terminal apparatus is the sound picked up by the mobile communication terminal apparatus 300-$N_1$ and the sound picked up by the mobile communication terminal apparatus 300-$N_2$. However, because the sound picked up by the mobile communication terminal apparatus 300-$N_2$ is present in the mobile communication terminal apparatus 300-$N_2$, the multipoint control unit 100 is not required to transmit the sound picked up by the mobile communication terminal apparatus 300-$N_2$ to the mobile communication terminal apparatus 300-$N_2$. Thus, in the mobile communication terminal apparatus 300-$N_2$, it is preferable to output the sound picked up by the mobile communication terminal apparatus 300-$N_1$ with the highest possible quality. Thus, the bit stream generation section 120 generates a bit stream for a mobile terminal including, as a code representing a sound signal, the monaural code $CMM_{N1}$ included in the mobile terminal sending bit stream output by the mobile communication terminal apparatus 300-$N_1$, and outputs the bit stream to the mobile communication terminal apparatus 300-$N_2$, that is, to a mobile transmission path 500-$N_2$ to which the mobile communication terminal apparatus 300-$N_2$ is connected. That is, the code string representing a sound signal included in the bit stream for a mobile terminal for the mobile communication terminal apparatus 300-$N_2$ includes the monaural code $CMM_{N1}$ as a code representing a sound signal.

The bit stream of the third pattern output by the bit stream generation section 120 is a bit stream for a mobile terminal including, as a code representing a sound signal, a monaural code $CTM_{N1N2}$ obtained by mixing, and then coding, a decoded digital sound signals obtained by decoding each of the monaural code $CMM_{N1}$ included in a mobile terminal sending bit stream output by the mobile communication terminal apparatus 300-$N_1$ and the monaural code $CMM_{N2}$ included in a mobile terminal sending bit stream output by the mobile communication terminal apparatus 300-$N_2$. As described above, if the selection point information is "Mobile-$N_1$" and "Mobile-$N_2$", then the sound required at each terminal apparatus is the sound picked up by the mobile communication terminal apparatus 300-$N_1$ and the sound picked up by the mobile communication terminal apparatus 300-$N_2$. Thus, in each mobile communication terminal apparatus 300-$n_{else}$ ($n_{else}$ is an integer from 1 to N and is different from both $N_1$ and $N_2$) that is neither the mobile communication terminal apparatus 300-$N_1$ nor the mobile communication terminal apparatus 300-$N_2$, it is preferable to output the sound picked up by the mobile communication terminal apparatus 300-$N_1$ and the sound picked up by the mobile communication terminal apparatus 300-$N_2$ with the highest possible quality. However, the communication capacity of the mobile transmission path 500-$n_{else}$ between the multipoint control unit 100 and each mobile communication terminal apparatus 300-$n_{else}$ is not large enough to send two monaural codes. As such, in each mobile communication terminal apparatus 300-$n_{else}$, it is desirable at least to output the sound picked up by the mobile communication terminal apparatus 300-$N_1$ and the sound picked up by the mobile communication terminal apparatus 300-$N_2$ even if the sound quality is degraded.

Thus the bit stream generation section 120 obtains the first decoded digital sound signal by decoding the monaural code $CMM_{N1}$ included in the mobile terminal sending bit stream output by the mobile communication terminal apparatus 300-$N_1$, and obtains the second decoded digital sound signal by decoding the monaural code $CMM_{N2}$ included in the mobile terminal sending bit stream output by the mobile communication terminal apparatus 300-$N_2$, obtains a mixed digital sound signal by mixing the first decoded digital sound signal and the second decoded digital sound signal by obtaining a sequence of an average value of the samples corresponding to the first decoded digital sound signal and the second decoded digital sound signal, and the like, further, obtains the monaural code $CTM_{N1N2}$ by coding the mixed digital sound signal by the above-described first coding scheme, generates a bit stream for a mobile terminal including, as a code representing a sound signal, the monaural code $CTM_{N1N2}$ obtained from a mixed digital sound signal, and outputs the bit stream to each mobile communication terminal apparatus 300-$n_{else}$, that is, to each mobile transmission path 500-$n_{else}$ to which each mobile communication terminal apparatus 300-$n_{else}$ is connected. That is, the code string representing a sound signal included in the bit stream for a mobile terminal for the mobile communication terminal apparatus 300-$n_{else}$ includes, as a code representing a sound signal, the monaural code $CTM_{N1N2}$.

Note that when the point selection section 110 has obtained M+N decoded digital sound signals, the first decoded digital sound signal and the second decoded digital signal are the same as two of the M+N decoded digital sound signals obtained by the point selection section 110, and therefore, instead of obtaining a decoded digital sound signal by decoding a monaural code at the bit stream generation section 120, the point selection section 110 may output, to the bit stream generation section 120, the decoded digital sound signal obtained by the point selection section 110 so that the bit stream generation section 120 uses the decoded digital sound signal input from the point selection section 110.

The bit stream of the fourth pattern output by the bit stream generation section 120 is a bit stream for a fixed terminal including, as codes representing a sound signal, the monaural code $CMM_{N1}$ included in the mobile terminal sending bit stream output by the mobile communication terminal apparatus 300-$N_1$ and the monaural code $CMM_{N2}$ included in the mobile terminal sending bit stream output by the mobile communication terminal apparatus 300-$N_2$. As described above, if the selection point information is "Mobile-$N_1$" and "Mobile-$N_2$", then the sound required at each terminal apparatus is the sound picked up by the mobile communication terminal apparatus 300-$N_1$ and the sound picked up by the mobile communication terminal apparatus 300-$N_2$. Thus, in each fixed communication terminal apparatus 200-$m$ (m is an integer from 1 to M), it is preferable to output the sound picked up by the mobile communication terminal apparatus 300-$N_1$ and the sound picked up by the mobile communication terminal apparatus 300-$N_1$ with the highest possible quality. Thus, the bit stream generation section 120 generates a bit stream for a fixed terminal including, as codes representing a sound signal, the monaural code $CMM_{N1}$ included in the mobile terminal sending bit stream output by the mobile communication terminal apparatus 300-$N_1$ and the monaural code $CMM_{N2}$ included in the mobile terminal sending bit stream output by the mobile communication terminal apparatus 300-$N_2$, and outputs the bit stream to the fixed communication terminal apparatus 200-$m$. More specifically, the bit stream generation section 120 generates a bit stream for a fixed terminal including the monaural code $CMM_{N1}$ included in the fixed terminal sending bit stream output by the mobile communication terminal apparatus 300-$N_1$ and the monaural code $CMM_{N2}$ included in the mobile terminal sending bit stream output by the mobile communication terminal apparatus 300-$N_2$ as codes representing a sound signal, and including a control code representing that the code information is "information representing that a code included in a code string representing a sound signal is two monaural codes" and outputs the bit stream to each fixed transmission path 400-$m$ to which each fixed communication terminal apparatus 200-$m$ is connected. That is, the code string representing a sound signal included in the bit stream for a fixed terminal for the fixed communication terminal apparatus 200-$m$ includes, as codes representing a sound signal, the monaural code $CMM_{N1}$ and the monaural code $CMM_{N2}$.

Operation of Multipoint Phone Connection System 10

Next, a frame-wise operation of the multipoint phone connection system 10 according to the first embodiment, that is, a multipoint phone connection method performed by the multipoint phone connection system 10 according to the first embodiment for each frame is described.

Up to the point where a bit stream is transmitted to the multipoint control unit 100 from each terminal apparatus, the multipoint phone connection system 10 performs the same operation in any of the cases described below. More specifically, in any of the cases described below, each fixed communication terminal apparatus 200-$m$ obtains a monaural code $CFM_m$ by coding a mixed signal of picked-up digital sound signals of two channels by the first coding scheme, obtains a code representing information corresponding to a difference between the picked-up digital sound signals of two channels as an extension code $CFE_m$, and outputs the obtained monaural code $CFM_m$ and the obtained extension code $CFE_m$ to the multipoint control unit 100 as codes representing the picked-up digital sound signals of two channels. In addition, in any of the cases described below, each mobile communication terminal apparatus 300-$n$ obtains a monaural code $CMM_n$ by coding a picked-up digital sound signal of one channel by the first coding scheme, and outputs the obtained monaural code $CMM_n$ as a code representing the picked-up digital sound signal of one channel to the multipoint control unit 100.

After the bit stream is transmitted to the multipoint control unit 100 from each terminal apparatus, the multipoint phone connection system 10 performs the following operation for each case described below.

Case where Only Fixed Communication Terminal Apparatus 200-$M_1$ ($M_1$ is any One of Integers from 1 to M) is Selected In the above-described example in which the power of the sound signal is used as the selection criterion, this case corresponds to a case where the fixed communication terminal apparatus 200-$M_1$ has a sound signal of a largest power in M+N terminal apparatuses, and the power of the sound signal whose power is second largest is smaller than a threshold.

In this case, the point selection section 110 of the multipoint control unit 100 outputs the selection point information of the above-described case 1, and the bit stream generation section 120 of the multipoint control unit 100 performs the operation of the above-described "Case Where Selection Point Information is Information of Case 1", and therefore, the multipoint phone connection system 10 operates in the following manner, which includes subsequent operations of each terminal apparatus.

The multipoint control unit 100 does not output a code representing a sound signal to the fixed communication terminal apparatus 200-$M_1$. The fixed communication terminal apparatus 200-$M_1$ does not decode a code representing a sound signal and does not obtain a decoded sound signal.

The multipoint control unit 100 outputs, to each fixed communication terminal apparatus 200-$m_{else}$ ($m_{else}$ is an integer from 1 to M and is different from $M_1$) other than the fixed communication terminal apparatus 200-$M_1$, the extension code $CFE_{M1}$ and the monaural code $CFM_{M1}$ representing the sound signal of the two-channel stereo picked up by the fixed communication terminal apparatus 200-$M_1$. From the monaural code $CFM_{M1}$ and the extension code $CFE_{M1}$ output by the multipoint control unit 100, each fixed communication terminal apparatus 200-$m_{else}$ obtains a decoded sound signal of two-channel stereo corresponding to the sound signal of the two-channel stereo picked up by the fixed communication terminal apparatus 200-$M_1$ by performing the process of the above-described case A.

The multipoint control unit 100 outputs, to each mobile communication terminal apparatus 300-$n$ (n is an integer from 1 to N), only the monaural code $CFM_{M1}$ of the codes representing a sound signal of the two-channel stereo picked up by the fixed communication terminal apparatus $200\text{-}M_1$. From the monaural code $CFM_{M1}$ output by the multipoint control unit 100, each mobile communication terminal apparatus 300-*n* obtains a monaural decoded sound signal in which a sound signal of the two-channel stereo picked up by the fixed communication terminal apparatus $200\text{-}M_1$.

Note that in an example of a voice conference, this case corresponds to a frame in which only the fixed communication terminal apparatus $200\text{-}M_1$ is the voice source point, and the multipoint phone connection system 10 operates as follows.

The multipoint control unit 100 does not output a code representing a sound signal to the fixed communication terminal apparatus $200\text{-}M_1$ of the voice source point. The fixed communication terminal apparatus $200\text{-}M_1$ does not decode a code representing a sound signal and does not obtain a decoded sound signal.

The multipoint control unit 100 outputs, to each fixed communication terminal apparatus $200\text{-}M_{else}$ that is not the voice source point, the monaural code $CFM_{M1}$ and the extension code $CFE_{M1}$ representing the sound signal of the two-channel stereo of the voice source point. From the monaural code $CFM_{M1}$ and the extension code $CFE_{M1}$ output by the multipoint control unit 100, each fixed communication terminal apparatus $200\text{-}m_{else}$ that is not the voice source point obtains, by performing the process of the above-described case A, a decoded sound signal of two-channel stereo that is a sound signal corresponding to the sound signal of the two-channel stereo of the voice source point, in which paired coding and decoding are not connected in tandem.

The multipoint control unit 100 outputs, to each mobile communication terminal apparatus 300-*n*, only the monaural code $CFM_{M1}$ of codes representing a sound signal of two-channel stereo of the voice source point. From the monaural code $CFM_{M1}$ output by the multipoint control unit 100, each mobile communication terminal apparatus 300-*n* obtains a monaural decoded sound signal that is a mixed sound signal of the sound signal of the two-channel stereo of the voice source point in which paired coding and decoding are not connected in tandem.

Case where Only Mobile Communication Terminal Apparatus $300\text{-}N_1$ ($N_1$ is any One of Integers from 1 to N) is Selected In the above-described example in which the power of the sound signal is used as the selection criterion, this case corresponds to a case where the mobile communication terminal apparatus $300\text{-}N_1$ has a sound signal of a largest power in M+N terminal apparatuses, and the power of the sound signal whose power is second largest is smaller than a threshold.

In this case, the point selection section 110 of the multipoint control unit 100 outputs the selection point information of the above-described case 2, and the bit stream generation section 120 of the multipoint control unit 100 performs the operation of the above-described "Case Where Selection Point Information is Information of Case 2", and therefore, the multipoint phone connection system 10 operates in the following manner, which includes subsequent operations of each terminal apparatus.

The multipoint control unit 100 does not output a code representing a sound signal to the mobile communication terminal apparatus $300\text{-}N_1$. The mobile communication terminal apparatus $300\text{-}N_1$ does not decode a code representing a sound signal and does not obtain a decoded sound signal.

The multipoint control unit 100 outputs, to each mobile communication terminal apparatus $300\text{-}n_{else}$ ($n_{else}$ is an integer from 1 to N and is different from $N_1$) other than the mobile communication terminal apparatus $300\text{-}N_1$, the monaural code $CMM_{N1}$ representing a monaural sound signal picked up by the mobile communication terminal apparatus $300\text{-}N_1$. From the monaural code $CMM_{N1}$ output by the multipoint control unit 100, each mobile communication terminal apparatus $300\text{-}n_{else}$ obtains a monaural decoded sound signal corresponding to the monaural sound signal picked up by the mobile communication terminal apparatus $300\text{-}N_1$.

The multipoint control unit 100 outputs, to each fixed communication terminal apparatus 200-*m* (m is an integer from 1 to M), the monaural code $CMM_{N1}$ representing the monaural sound signal picked up by the mobile communication terminal apparatus $300\text{-}N_1$. From the monaural code $CMM_{N1}$ output by the multipoint control unit 100, each fixed communication terminal apparatus 200-*m* obtains, by performing the process of the above-described case C, a monaural decoded sound signal corresponding to the monaural sound signal picked up by the mobile communication terminal apparatus $300\text{-}N_1$.

Note that in an example of a voice conference, this case corresponds to a frame in which only the mobile communication terminal apparatus $300\text{-}N_1$ is the voice source point, and the multipoint phone connection system 10 operates as follows.

The multipoint control unit 100 does not output a code representing a sound signal to the mobile communication terminal apparatus $300\text{-}N_1$ of the voice source point. The mobile communication terminal apparatus $300\text{-}N_1$ does not decode a code representing a sound signal and does not obtain a decoded sound signal.

The multipoint control unit 100 outputs, to each mobile communication terminal apparatus $300\text{-}n_{else}$ that is not the voice source point, the monaural code $CMM_{N1}$ representing the monaural sound signal of the voice source point. From the monaural code $CMM_{N1}$ output by the multipoint control unit 100, each mobile communication terminal apparatus $300\text{-}n_{else}$ that is not the voice source point obtains a monaural decoded sound signal that is a sound signal corresponding to the monaural sound signal of the voice source point in which paired coding and decoding are not connected in tandem.

The multipoint control unit 100 outputs, to each fixed communication terminal apparatus 200-*m*, the monaural code $CMM_{N1}$ representing the monaural sound signal of the voice source point. From the monaural code $CMM_{N1}$ output by the multipoint control unit 100, each fixed communication terminal apparatus 200-*m* obtains, by performing the process of the above-described case C, a monaural decoded sound signal that is a sound signal corresponding to the monaural sound signal of the voice source point in which paired coding and decoding are not connected in tandem.

Case where Fixed Communication Terminal Apparatus 200-M$_1$ (M$_1$ is any One of Integers from 1 to M) and Fixed Communication Terminal Apparatus 200-M$_2$ (M$_2$ is any One of Integers from 1 to M and is Different from M$_1$) are Selected In the above-described example in which the power of the sound signal is used as the selection criterion, this case corresponds to a case where an apparatus whose power of the sound signal is largest and an apparatus whose power is second largest and is equal to or greater than a threshold in M+N terminal apparatuses are the fixed communication terminal apparatus 200-M$_1$ and the fixed communication terminal apparatus 200-M$_2$.

In this case, the point selection section 110 of the multipoint control unit 100 outputs the selection point information of the above-described case 3, and the bit stream generation section 120 of the multipoint control unit 100 performs the operation of the above-described "Case Where Selection Point Information is Information of Case 3", and therefore, the multipoint phone connection system 10 operates in the following manner, which includes subsequent operations of each terminal apparatus.

The multipoint control unit 100 outputs, to the fixed communication terminal apparatus 200-M$_1$, the monaural code CFM$_{M2}$ and the extension code CFE$_{M2}$ representing the sound signal of the two-channel stereo picked up by the fixed communication terminal apparatus 200-M$_2$. From the monaural code CFM$_{M2}$ and the extension code CFE$_{M2}$ output by the multipoint control unit 100, the fixed communication terminal apparatus 200-M$_1$ obtains, by performing the process of the above-described case A, a decoded sound signal of two-channel stereo corresponding to the sound signal of the two-channel stereo picked up by the fixed communication terminal apparatus 200-M$_2$.

The multipoint control unit 100 outputs, to the fixed communication terminal apparatus 200-M$_2$, the extension code CFE$_{M1}$ and the monaural code CFM$_{M1}$ representing the sound signal of the two-channel stereo picked up by the fixed communication terminal apparatus 200-M$_1$. From the monaural code CFM$_{M1}$ and the extension code CFE$_{M1}$ output by the multipoint control unit 100, the fixed communication terminal apparatus 200-M$_2$ obtains, by performing the process of the above-described case A, a decoded sound signal of two-channel stereo corresponding to the sound signal of the two-channel stereo picked up by the fixed communication terminal apparatus 200-M$_1$.

The multipoint control unit 100 outputs, to each fixed communication terminal apparatus 200-M$_{else}$ (m$_{else}$ is an integer from 1 to M and is different from both M$_1$ and M$_2$) that is neither the fixed communication terminal apparatus 200-M$_1$ nor the fixed communication terminal apparatus 200-M$_2$, the monaural code CFM$_{M1}$ of the codes representing a sound signal of the two-channel stereo picked up by the fixed communication terminal apparatus 200-M$_1$, and the monaural code CFM$_{M2}$ of the codes representing a sound signal of two-channel stereo picked up by the fixed communication terminal apparatus 200-M$_2$. From the two monaural codes CFM$_{M1}$ and CFM$_{M2}$ output by the multipoint control unit 100, each fixed communication terminal apparatus 200-m$_{else}$ obtains, by performing the process of the above-described case B, decoded sound signals of two channels, namely, a monaural decoded sound signal in which the sound signal of the two-channel stereo picked up by the fixed communication terminal apparatus 200-M$_1$ is mixed, and a monaural decoded sound signal in which the sound signal of the two-channel stereo picked up by the fixed communication terminal apparatus 200-M$_2$ is mixed.

The multipoint control unit 100 outputs, to each mobile communication terminal apparatus 300-n (n is an integer from 1 to N), the monaural code CTM$_{M1M2}$ obtained by mixing, and then coding a sound signal obtained by decoding the monaural code CFM$_{M1}$ of the codes representing a sound signal of the two-channel stereo picked up by the fixed communication terminal apparatus 200-M$_1$ and a sound signal obtained by decoding the monaural code CFM$_{M1}$ of the codes representing a sound signal of two-channel stereo picked up by the fixed communication terminal apparatus 200-M$_2$. From one monaural code CTM$_{M1M2}$ output by the multipoint control unit 100, each mobile communication terminal apparatus 300-n obtains one monaural decoded sound signal corresponding to a mixed sound signal of the sound signal of the two-channel stereo picked up by the fixed communication terminal apparatus 200-M$_1$ and the sound signal of the two-channel stereo picked up by the fixed communication terminal apparatus 200-M$_2$.

Note that in an example of a voice conference, this case corresponds to a frame in which the two points, the fixed communication terminal apparatus 200-M$_1$ and the fixed communication terminal apparatus 200-M$_2$, are the voice source points, and the multipoint phone connection system 10 operates as follows.

The multipoint control unit 100 outputs, to the fixed communication terminal apparatus 200-M$_1$ and the fixed communication terminal apparatus 200-M$_2$ of the voice source points, an extension code CFE$_{Mx}$ and a monaural code CFM$_{Mx}$ (x is 1 or 2) representing the sound signal of the two-channel stereo of the other voice source point. From the monaural code CFM$_{Mx}$ and the extension code CFE$_{Mx}$ output by the multipoint control unit 100, each of the fixed communication terminal apparatus 200-M$_1$ and the fixed communication terminal apparatus 200-M$_2$ of the voice source points obtains, by performing the process of the above-described case A, a decoded sound signal of two-channel stereo that is a sound signal corresponding to the sound signal of the two-channel stereo of the other voice source point in which paired coding and decoding are not connected in tandem.

The multipoint control unit 100 outputs, to each fixed communication terminal apparatus 200-m$_{else}$ that is not the voice source point, the monaural codes CFM$_{M1}$ and CFM$_{M2}$ of codes representing sound signals of two-channel stereo of the two voice source points. From the two monaural codes CFM$_{M1}$ and CFM$_{M2}$ output by the multipoint control unit 100, each fixed communication terminal apparatus 200-m$_{else}$ that is not the voice source point obtains, by performing the process of the above-described case B, decoded sound signals of two channels that are two monaural sound signals corresponding to sound signals, each of which is a mixed sound signal of the two-channel stereo of each voice source point and in which paired coding and decoding are not connected in tandem.

The multipoint control unit 100 outputs, to each mobile communication terminal apparatus 300-n, the monaural code CTM$_{M1M2}$ representing one sound signal obtained by mixing, and then coding, two sound signals obtained by decoding the monaural codes CFM$_{M1}$ and CFM$_{M2}$ of the codes representing sound signals of two-channel stereo of the two voice source points. From one monaural code $CTM_{M1M2}$ output by the multipoint control unit 100, each mobile communication terminal apparatus 300-$n$ obtains one decoded sound signal that is a mixed monaural sound signal of all sound signals of the two voice source points in which paired coding and decoding are connected in tandem.

Case where Fixed Communication Terminal Apparatus 200-$M_1$ ($M_1$ is any One of Integers from 1 to M) and the Mobile Communication Terminal Apparatus 300-$N_1$ ($N_1$ is any One of Integers from 1 to N) are Selected In the above-described example in which the power of the sound signal is used as the selection criterion, this case corresponds to a case where an apparatus whose power of the sound signal is largest and an apparatus whose power is second largest and is equal to or greater than a threshold in M+N terminal apparatuses are the fixed communication terminal apparatus 200-$M_1$ and the mobile communication terminal apparatus 300-$N_1$.

In this case, the point selection section 110 of the multipoint control unit 100 outputs the selection point information of the above-described case 4, and the bit stream generation section 120 of the multipoint control unit 100 performs the operation of the above-described "Case Where Selection Point Information is Information of Case 4", and therefore, the multipoint phone connection system 10 operates in the following manner, which includes subsequent operations of each terminal apparatus.

The multipoint control unit 100 outputs, to the fixed communication terminal apparatus 200-$M_1$, the monaural code $CMM_{N1}$ representing a monaural sound signal picked up by the mobile communication terminal apparatus 300-$N_1$. From one monaural code $CMM_{N1}$ output by the multipoint control unit 100, the fixed communication terminal apparatus 200-$M_1$ obtains, by performing the process of the above-described case C, a monaural decoded sound signal corresponding to the monaural sound signal picked up by the mobile communication terminal apparatus 300-$N_1$.

The multipoint control unit 100 outputs, to the mobile communication terminal apparatus 300-$N_1$, a monaural code $CFM_{M1}$ of the codes representing a sound signal of the two-channel stereo picked up by the fixed communication terminal apparatus 200-$M_1$. From one monaural code $CFM_{M1}$ output by the multipoint control unit 100, the mobile communication terminal apparatus 300-$N_1$ obtains a monaural decoded sound signal in which the sound signal of the two-channel stereo picked up by the fixed communication terminal apparatus 200-$M_1$ is mixed.

The multipoint control unit 100 outputs, to each fixed communication terminal apparatus 200-$M_{else}$ ($m_{else}$ is an integer from 1 to M and is different from $M_1$) that is not the fixed communication terminal apparatus 200-$M_1$, the monaural code $CFM_{M1}$ of the codes representing a sound signal of the two-channel stereo picked up by the fixed communication terminal apparatus 200-$M_1$ and the monaural code $CMM_{N1}$ representing a monaural sound signal picked up by the mobile communication terminal apparatus 300-$N_1$. From the two monaural codes $CFM_{M1}$ and $CMM_{N1}$ output by the multipoint control unit 100, each fixed communication terminal apparatus 200-$m_{else}$ obtains, by performing the process of the above-described case B, decoded sound signals of two channels, namely, a monaural sound signal in which the sound signal of the two-channel stereo picked up by the fixed communication terminal apparatus 200-$M_1$ is mixed, and a monaural sound signal corresponding to the monaural sound signal picked up by the mobile communication terminal apparatus 300-$N_1$.

The multipoint control unit 100 outputs, to each mobile communication terminal apparatus 300-$n_{else}$ ($n_{else}$ is an integer from 1 to N and is different from $N_1$) that is not the mobile communication terminal apparatus 300-$N_1$, the monaural code $CTM_{M1N1}$ obtained by mixing, and then coding a sound signal obtained by decoding the monaural code $CFM_{M1}$ of the codes representing a sound signal of the two-channel stereo picked up by the fixed communication terminal apparatus 200-$M_1$ and a sound signal obtained by decoding the monaural code $CMM_{N1}$ representing a monaural sound signal picked up by the mobile communication terminal apparatus 300-$N_1$. From one monaural code $CTM_{M1N1}$ output from the multipoint control unit 100, each mobile communication terminal apparatus 300-$n_{else}$ obtains one monaural decoded sound signal corresponding to a mixed sound signal of the sound signal of the two-channel stereo picked up by the fixed communication terminal apparatus 200-$M_1$ and the monaural sound signal picked up by the mobile communication terminal apparatus 300-$N_1$.

Note that in an example of a voice conference, this case corresponds to a frame in which the two points, the fixed communication terminal apparatus 200-$M_1$ and the mobile communication terminal apparatus 300-$N_1$, are voice source points, and the multipoint phone connection system 10 operates as follows.

The multipoint control unit 100 outputs, to the fixed communication terminal apparatus 200-$M_1$ of the voice source point, the monaural code $CMM_{N1}$ representing the sound signal of the other voice source point. From one monaural code $CMM_{N1}$ output by the multipoint control unit 100, the fixed communication terminal apparatus 200-$M_1$ of the voice source point obtains, by performing the process of the above-described case C, a monaural decoded sound signal that is a monaural sound signal corresponding to the monaural sound signal of the other voice source point in which paired coding and decoding are not connected in tandem.

The multipoint control unit 100 outputs, to the mobile communication terminal apparatus 300-$N_1$ of the voice source point, only the monaural code $CFM_{M1}$ of codes representing a sound signal of two-channel stereo of the other voice source point. From one monaural code $CFM_{M1}$ output by the multipoint control unit 100, the mobile communication terminal apparatus 300-$N_1$ obtains a monaural decoded sound signal that is a mixed sound signal of the sound signal of the two-channel stereo of the other voice source point in which paired coding and decoding are not connected in tandem.

The multipoint control unit 100 outputs, to each fixed communication terminal apparatus 200-$m_{else}$ that is not the voice source point, the two monaural codes $CFM_{M1}$ and $CMM_{N1}$ representing the sound signals of the two voice source points. That is, the monaural code $CFM_{M1}$ of the codes representing the sound signal of the two-channel stereo of one voice source point and the monaural code $CMM_{N1}$ representing the monaural sound signal of the other voice source point are output. From the two monaural codes $CFM_{M1}$ and $CMM_{N1}$ output by the multipoint control unit 100, each fixed communication terminal apparatus 200-$m_{else}$ that is not the voice source point obtains, by performing the process of the above-described case B, decoded sound signals of two channels that are sound signals corresponding to the monaural sound signals of the two voice source points in which paired coding and decoding are not connected in tandem. The sound signals corresponding to the monaural sound signals of the two voice source points are a sound signal corresponding to a sound signal in which the sound signal of the two-channel stereo of one voice source point is mixed, and a sound signal corresponding to the monaural sound signal of another voice source point.

The multipoint control unit 100 outputs, to each mobile communication terminal apparatus 300-$n_{else}$ that is not the voice source point, the monaural code $CTM_{M1N1}$ representing one sound signal obtained by mixing, and then coding, sound signals obtained by decoding the monaural codes $CFM_{M1}$ and $CMM_{N1}$ of the two voice source points. From one monaural code $CTM_{M1N1}$ output from the multipoint control unit 100, each mobile communication terminal apparatus 300-$n_{else}$ that is not the voice source point obtains one decoded sound signal that is a monaural sound signal in which all sound signals of the two voice source points are mixed, and paired coding and decoding are connected in tandem mixed sound signal.

Case where Mobile Communication Terminal Apparatus 300-$N_1$ ($N_1$ is any One of Integers from 1 to N) and Mobile Communication Terminal Apparatus 300-$N_2$ ($N_2$ is any One of Integers from 1 to N and is Different from $N_1$) are Selected In the above-described example in which the power of the sound signal is used as the selection criterion, this case corresponds to a case where an apparatus whose power of the sound signal is largest and an apparatus whose power is second largest and is equal to or greater than a threshold in M+N terminal apparatuses are the mobile communication terminal apparatus 300-$N_1$ ($N_1$ is any one of integers from 1 to N) and the mobile communication terminal apparatus 300-$N_2$ ($N_2$ is any one of integers from 1 to N and is different from $N_1$).

In this case, the point selection section 110 of the multipoint control unit 100 outputs the selection point information of the above-described case 5, and the bit stream generation section 120 of the multipoint control unit 100 performs the operation of the above-described "Case Where Selection Point Information is Information of Case 5", and therefore, the multipoint phone connection system 10 operates in the following manner, which includes subsequent operations of each terminal apparatus.

The multipoint control unit 100 outputs, to the mobile communication terminal apparatus 300-$N_1$, the monaural code $CMM_{N2}$ representing a monaural sound signal picked up by the mobile communication terminal apparatus 300-$N_2$. From one monaural code $CMM_{N2}$ output by the multipoint control unit 100, the mobile communication terminal apparatus 300-$N_1$ obtains a monaural decoded sound signal corresponding to a monaural sound signal picked up by the mobile communication terminal apparatus 300-$N_2$.

The multipoint control unit 100 outputs, to the mobile communication terminal apparatus 300-$N_2$, the monaural code $CMM_{N1}$ representing a monaural sound signal picked up by the mobile communication terminal apparatus 300-$N_1$. From one monaural code $CMM_{N1}$ output by the multipoint control unit 100, the mobile communication terminal apparatus 300-$N_2$ obtains a monaural decoded sound signal corresponding to the monaural sound signal picked up by the mobile communication terminal apparatus 300-$N_1$.

The multipoint control unit 100 outputs, to each mobile communication terminal apparatus 300-$n_{else}$ ($n_{else}$ is an integer from 1 to N and is different from both $N_1$ and $N_2$) that is neither the mobile communication terminal apparatus 300-$N_1$ nor the mobile communication terminal apparatus 300-$N_2$, the monaural code $CMM_{N1N2}$ obtained by mixing, and then coding a sound signal obtained by decoding the monaural code $CMM_{N1}$ representing a monaural sound signal picked up by the mobile communication terminal apparatus 300-$N_1$ and a sound signal obtained by decoding the monaural code $CMM_{N2}$ representing a monaural sound signal picked up by the mobile communication terminal apparatus 300-$N_2$. From one monaural code $CMM_{N1N2}$ output by the multipoint control unit 100, each mobile communication terminal apparatus 300-$n_{else}$ obtains one monaural decoded sound signal corresponding to a mixed sound signal of a monaural sound signal picked up by the mobile communication terminal apparatus 300-$N_1$ and a monaural sound signal picked up by the mobile communication terminal apparatus 300-$N_2$.

The multipoint control unit 100 outputs, to each fixed communication terminal apparatus 200-$m$ ($m$ is an integer from 1 to M), the monaural code $CMM_{N1}$ representing a monaural sound signal picked up by the mobile communication terminal apparatus 300-$N_1$ and the monaural code $CMM_{N2}$ representing a monaural sound signal picked up by the mobile communication terminal apparatus 300-$N_2$. From the two monaural codes $CMM_{N1}$ and $CMM_{N2}$ output by the multipoint control unit 100, each fixed communication terminal apparatus 200-$m$ obtains, by performing the process of the above-described case B, decoded sound signals of two channels, namely, a sound signal corresponding to a monaural sound signal picked up by the mobile communication terminal apparatus 300-$N_1$, and a sound signal corresponding to a monaural sound signal picked up by the mobile communication terminal apparatus 300-$N_2$.

Note that in an example of a voice conference, this case corresponds to a frame in which the two points, the mobile communication terminal apparatus 300-$N_1$ and the mobile communication terminal apparatus 300-$N_2$, are the voice source points, and the multipoint phone connection system 10 operates as follows.

The multipoint control unit 100 outputs, to the mobile communication terminal apparatus 300-$N_1$ and the mobile communication terminal apparatus 300-$N_2$ of the voice source points, a monaural code $CMM_{MX}$ (x is 1 or 2) representing the monaural sound signal of the other voice source point. From the one monaural code $CMM_{MX}$ output by the multipoint control unit 100, each of the mobile communication terminal apparatus 300-$N_1$ and the mobile communication terminal apparatus 300-$N_2$ of the voice source points obtains a monaural decoded sound signal that is a sound signal corresponding to the monaural sound signal of the other voice source point in which paired coding and decoding are not connected in tandem.

The multipoint control unit 100 outputs, to each mobile communication terminal apparatus 300-$n_{else}$ that is not the voice source point, the monaural code $CTM_{M1M2}$ representing one sound signal obtained by mixing and coding sound signals obtained by decoding the monaural codes $CMM_{N1}$ and $CMM_{M2}$ representing the monaural sound signals of the two voice source points. From one monaural code $CTM_{M1M2}$ output by the multipoint control unit 100, each mobile communication terminal apparatus 300-$n_{else}$ that is not the voice source point obtains one decoded sound signal that is a monaural sound signal in which all sound signals of the two voice source points are mixed, and paired coding and decoding are connected in tandem mixed sound signal.

The multipoint control unit 100 outputs, to each fixed communication terminal apparatus 200-$m$, the two monaural codes $CMM_{M1}$ and $CMM_{M2}$ representing the monaural sound signals of the two voice source points. From the two monaural codes $CMM_{M1}$ and $CMM_{M2}$ output by the multipoint control unit 100, each fixed communication terminal apparatus 200-$m$ obtains, by performing the process of the above-described case B, decoded sound signals of two channels that are two monaural sound signals corresponding to the monaural sound signals of the two voice source points in which paired coding and decoding are not connected in tandem.

Second Embodiment

While the coding section of the fixed communication terminal apparatus according to the first embodiment obtains, as an extension code, a code that cannot obtain any of decoded digital sound signals of two channels when using only the extension code, but can obtain both of the decoded digital sound signals of the two channels when used together with a monaural code, the extension code may be obtained as a code that can obtain both of the decoded digital sound signals of the two channels even when only the extension code is used without using a monaural code. This aspect is described as a second embodiment.

The configuration of the multipoint phone connection system 10 according to the second embodiment and the configuration of each apparatus included in the multipoint phone connection system 10 according to the second embodiment are same as the configuration of the multipoint phone connection system 10 according to the first embodiment and each apparatus included in the multipoint phone connection system 10 according to the first embodiment. The second embodiment differs from the first embodiment in the operations of the coding section 212-$m$ of the sound signal fixed transmission side unit 210-$m$ of the fixed communication terminal apparatus 200-$m$ and the decoding section 222-$m$ of the sound signal fixed reception side unit 220-$m$ of the fixed communication terminal apparatus 200-$m$, and therefore the differences between the second embodiment and the first embodiment are described below.

Coding Section 212-$m$

For each frame, the coding section 212-$m$ according to the second embodiment obtains a monaural code by coding a mixed signal of digital sound signals of two channels input from the sound pickup section 211-$m$ by the above-described first coding scheme, and obtains an extension code by stereo-coding the input digital sound signals of two channels by a predetermined third coding scheme, and, outputs the obtained monaural code and the obtained extension code to the control information granting section 213-$m$.

As the third coding scheme, the same coding scheme is used in the coding sections 212-$m$ of all sound signal fixed transmission side units 210-$m$. As the third coding scheme, it is necessary to use a coding scheme in which the bit rate of the extension code is equal to or smaller than a value obtained by subtracting the bit rate of the monaural code from the communication capacity of the fixed transmission path 400-$m$. As the third coding scheme, as long as the bit rate of the extension code satisfies the above-described condition, it is possible to use a coding scheme capable of efficiently coding sound signals of two channels so as to obtain, as an extension code, a code that can obtain both of decoded digital sound signals of two channels even when only the extension code is used without using a monaural code obtained by the first coding scheme. Naturally, as the third coding scheme, a scheme that codes each of sound signals of two channels by the above-described first coding scheme may be used, and each of sound signals of two channels may be coded by the above-described 13.2 kbps mode of the 3GPP EVS standard, for example.

Decoding Section 222-$m$

As in the decoding section 222-$m$ according to the first embodiment, when there is an input code on the basis of the input code information, the decoding section 222-$m$ according to the second embodiment obtains, for each frame, one or two decoded digital sound signals by decoding the input code and outputs the one or two signals to the playback section 223-$m$. It should be noted that, the decoding section 222-$m$ according to the second embodiment performs a process of a case A' described below instead of the above-described case A of the decoding section 222-$m$ according to the first embodiment.

Case A'

When the input code information is "information representing that a code included in a code string representing a sound signal is a pair of a monaural code and an extension code", the decoding section 222-$m$ according to the second embodiment obtains two decoded digital sound signals by decoding the input extension code by a predetermined third decoding scheme, and outputs the signals. That is, the decoding section 222-$m$ obtains the two decoded digital sound signals by decoding only the extension code without decoding the monaural code, and outputs the signals. Note that as the third decoding scheme, the decoding section 222-$m$ according to the second embodiment uses a decoding scheme corresponding to the third coding scheme used in the coding section 212-$m$ of the sound signal fixed transmission side unit 210-$m$ according to the second embodiment.

Modification 1 of Second Embodiment

In the decoding section of the fixed communication terminal apparatus according to the second embodiment, the monaural code is not used in the case of the above-described case A'. Thus, in this case, the control information analysis section of the fixed communication terminal apparatus may not output the monaural code. The following describes a difference between the second embodiment and this aspect as Modification 1 of the second embodiment.

Control Information Analysis Section 221-$m$

When the code information represented by the control code included in the input bit stream for a fixed terminal is "information representing that a code included in a code string representing a sound signal is a pair of a monaural code and an extension code", the control information analysis section 221-$m$ of Modification 1 of the second embodiment outputs code information represented by the control code included in the input bit stream for a fixed terminal, and an extension code of a code representing a sound signal included in the input bit stream for a fixed terminal. In the case other than the above-mentioned case, that is, when the code information represented by the control code included in the input bit stream for a fixed terminal is information other than "information representing that a code included in a code string representing a sound signal is a pair of a monaural code and an extension code", the control information analysis section 221-$m$ of Modification 1 of the second embodiment performs the same operation as the control information analysis section 221-$m$ according to the second embodiment.

Modification 2 of Second Embodiment

In the decoding section of the fixed communication terminal apparatus according to the second embodiment, the monaural code is not used in the case of the above-described case A'. Thus, in this case, the bit stream generation section of the multipoint control unit may not output the monaural code. The following describes a difference between the second embodiment and this aspect as Modification 2 of the second embodiment.

Bit Stream Generation Section 120

On the basis of the input selection point information, the bit stream generation section 120 of Modification 2 of the second embodiment generates, for each frame, a bit stream for a fixed terminal to be output to each fixed communication terminal apparatus 200-$m$ and a bit stream for a mobile terminal to be output to each mobile communication terminal apparatus 300-$n$ by using the input fixed terminal sending bit stream and the input mobile terminal sending bit stream, and outputs the bit stream, as with the bit stream generation section 120 according to the second embodiment. It should be noted that when the selection point information is information named "Fix-$M_1$", the bit stream generation section 120 of Modification 2 of the second embodiment generates, for each fixed communication terminal apparatus 200-$m_{else}$ ($M_{else}$ is an integer from 1 to M and is different from $M_1$) other than the fixed communication terminal apparatus 200-$M_1$, a bit stream for a fixed terminal including only the extension code $CFE_{M1}$ included in the fixed terminal sending bit stream output by the fixed communication terminal apparatus 200-$M_1$ as a code representing a sound signal and a control code representing that the code information is "information representing that a code included in a code string representing a sound signal is one extension code", and outputs the bit stream to each fixed transmission path 400-$m_{else}$ to which each fixed communication terminal apparatus 200-$m_{else}$ is connected.

Control Information Analysis Section 221-$m$

When the code information represented by the control code included in the input bit stream for a fixed terminal is "information representing that a code included in a code string representing a sound signal is one extension code", the control information analysis section 221-$m$ of Modification 2 of the second embodiment outputs code information represented by the control code included in the input bit stream for a fixed terminal, and one extension code that is a code representing a sound signal included in the input bit stream for a fixed terminal. In the case other than the above-mentioned case, that is, when the code information represented by the control code included in the input bit stream for a fixed terminal is information other than "information representing that a code included in a code string representing a sound signal is one extension code", the control information analysis section 221-$m$ of Modification 2 of the second embodiment performs the same operation as the control information analysis section 221-$m$ according to the second embodiment.

Decoding Section 222-$m$

When the input code information is "information representing that a code included in a code string representing a sound signal is one extension code", the decoding section 222-$m$ of Modification 2 of the second embodiment obtains two decoded digital sound signals by decoding the input extension code by the above-described third decoding scheme, and outputs the signals. In the case other than the above-mentioned case, that is, when the input code information is information other than "information representing that a code included in a code string representing a sound signal is one extension code", the decoding section 222-$m$ of Modification 2 of the second embodiment performs the same operation as the decoding section 222-$m$ according to the second embodiment.

Third Embodiment

In the first embodiment, the extension code obtained by the coding section of the fixed communication terminal apparatus is a code that cannot obtain any of decoded digital sound signals of two channels when using only the extension code, but can obtain both of the decoded digital sound signals of the two channels when used together with a monaural code, whereas in the second embodiment, the code is a code that can obtain both of decoded digital sound signals of two channels even when only the extension code is used without using a monaural code. Here, one of the extension code according to the first embodiment and the extension code according to the second embodiment may be selected for each frame. This aspect is described as the third embodiment.

The configuration of the multipoint phone connection system 10 according to the third embodiment and the configuration of each apparatus included in the multipoint phone connection system 10 according to the third embodiment are the same as the configuration of the multipoint phone connection system 10 and each apparatus included in the multipoint phone connection system 10 according to the first embodiment and the second embodiment. The differences between the third embodiment and the first embodiment are described below.

Coding Section 212-$m$

For each frame, the coding section 212-$m$ according to the third embodiment obtains a monaural code by coding a mixed signal of digital sound signals of two channels input from the sound pickup section 211-$m$ by the above-described first coding scheme, and outputs the obtained monaural code to the control information granting section 213-$m$ of the sound signal fixed transmission side unit 210-$m$ as in the coding section 212-$m$ according to the first embodiment and the second embodiment.

In addition, the coding section 212-$m$ according to the third embodiment outputs, to the control information granting section 213-$m$ of the sound signal fixed transmission side unit 210-$m$, an extension code including a code representing information corresponding to a difference between input digital sound signals of two channels, or an extension code obtained by stereo-coding an input digital sound signals of two channels by the above-described third coding scheme.

For example, the coding section 212-$m$ according to the third embodiment obtains a monaural code by coding a mixed signal of the input digital sound signals of two channels by the above-described first coding scheme, and obtains a provisional decoded digital sound signal by decoding the monaural code by the first decoding scheme, and, obtains a first provisional extension code by coding the information corresponding to a difference between the input digital sound signals of two channels by the above-described second coding scheme, obtains decoding information corresponding to the difference by decoding the first provisional extension code by the second decoding scheme, and, with the provisional decoded digital sound signal and the decoding information corresponding to the difference, obtains first provisional decoded digital sound signals of two channels by regarding the provisional decoded digital sound signal as a mixed signal of the first decoded digital sound signals of two channels, and regarding the decoding information corresponding to the difference as information corresponding to the difference between the first provisional decoded digital sound signals of two channels to thereby obtain first provisional decoded digital sound signals of two channels.

In addition, the coding section 212-$m$ obtains a second provisional extension code by coding digital sound signals of two channels by the above-described third coding scheme, and obtains a second provisional decoded digital sound signals of two channels by decoding the obtained second provisional extension code by the third decoding scheme. Then, the coding section 212-$m$ outputs, as an extension code, a provisional extension code corresponding to the smaller of coding distortion determined by the input digital sound signals of two channels and the first provisional decoded digital sound signals of two channels, and coding distortion determined by the input digital sound signals of two channels and the second provisional decoded digital sound signals of two channels. In addition, for example, by obtaining an estimated value of the coding distortion of the first provisional decoded digital sound signal as first estimated coding distortion, and obtaining an estimated value of the coding distortion of the second provisional decoded digital sound signal as second estimated coding distortion, the coding section 212-$m$ according to the third embodiment obtains an extension code by performing a coding process on the smaller of the first estimated coding distortion and the second estimated coding distortion, and outputs the extension code.

In addition, for example, by obtaining the first provisional extension code by coding the information corresponding to a difference between the input digital sound signals of two channels by the above-described second coding scheme, and obtaining the second provisional extension code by stereo-coding the input digital sound signals of two channels by the above-described third coding scheme, the coding section 212-$m$ according to the third embodiment selects one of the first provisional extension code and the second provisional extension code that has a smaller code amount, and outputs the selected code as an extension code. In addition, for example, by obtaining, as a first estimated code amount, the estimated value of the code amount of the extension code obtained by coding the information corresponding to a difference between the input digital sound signals of two channels by the above-described second coding scheme, and obtaining, as a second estimated code amount, the estimated value of the code amount of the extension code obtained by stereo-coding the input digital sound signals of two channels by the above-described third coding scheme, the coding section 212-$m$ according to the third embodiment obtains an extension code by performing a coding process on the smaller of the first estimated code amount and the second estimated code amount, and outputs the extension code.

In addition, for example, the coding section 212-$m$ according to the third embodiment operates to obtain an extension code including a code representing information corresponding to a difference between the input digital sound signals of two channels in accordance with a result of analyzation of the input digital sound signals of two channels, or obtain an extension code by stereo-coding the input digital sound signals of two channels by the above-described third coding scheme, and outputs the obtained extension code. In addition, for example, under the control of a control section (not illustrated) of the fixed communication terminal apparatus 200-$m$, the coding section 212-$m$ according to the third embodiment operates to obtain an extension code including the code representing information corresponding to a difference between the input digital sound signals of two channels, or obtain an extension code by stereo-coding the input digital sound signals of two channels by the above-described third coding scheme, and outputs the obtained extension code.

Further, the coding section 212-$m$ according to the third embodiment obtains information that identifies whether the output extension code is an extension code including a code representing information corresponding to a difference between the input digital sound signals of two channels, or an extension code obtained by stereo-coding the input digital sound signals of two channels by the above-described third coding scheme, and outputs the information to the control information granting section 213-$m$.

Control Information Granting Section 213-$m$

When a code representing a sound signal is a monaural code and an extension code, the control information granting section 213-$m$ of third embodiment outputs control code representing code information including not only "information representing that a code included in a code string representing a sound signal is a pair of a monaural code and an extension code", but also information that identifies which of the above-described extension codes is the extension code, that is, "information that identifies whether the extension code is an extension code including a code representing information corresponding to difference, or is an extension code obtained by the third coding scheme".

Decoding Section 222-$m$

The decoding section 222-$m$ according to the third embodiment performs the process of the above-described case A of the decoding section 222-$m$ according to the first embodiment in a case where the input code information is "information representing that a code included in a code string representing a sound signal is a pair of a monaural code and an extension code", and the "information that identifies whether the extension code is an extension code including a code representing information corresponding to difference, or is an extension code obtained by the third coding scheme" or performs the process of the above-described case A' of the decoding section 222-$m$ according to the second embodiment in a case where the input code information is "information representing that a code included in a code string representing a sound signal is a pair of a monaural code and an extension code", and "information that identifies whether the extension code is an extension code including a code representing information corresponding to difference, or is an extension code obtained by the third coding scheme".

In other cases, that is, when the input code information is information other than "information representing that a code included in a code string representing a sound signal is a pair of a monaural code and an extension code", the decoding section 222-$m$ according to the third embodiment operates as with the decoding section 222-*m* according to the first embodiment and the second embodiment.

Note that the third embodiment may be modified as with Modification 1 or Modification 2 of the second embodiment.

OTHER EMBODIMENTS

Number of Terminal Apparatuses in Configuration in which Point Selection Section Selects Up to Two Points For the sake of simplicity of description, the above-mentioned embodiments are described with an example in which the multipoint phone connection system includes two or more fixed communication terminal apparatuses and two or more mobile communication terminal apparatuses. However, the number of the terminal apparatuses included in the multipoint phone connection system according to the above-mentioned embodiments is not limited thereto, and it suffices that the multipoint phone connection system according to the above-mentioned embodiments includes one or more fixed communication terminal apparatuses and one or more mobile communication terminal apparatuses such that the total number of fixed communication terminal apparatuses and mobile communication terminal apparatuses is three or more. That is, it suffices in the multipoint phone connection system of the above-mentioned embodiments, M≥1, N≥1, and M+N≥3.

It should be noted that, when M is 1, that is, when the multipoint phone connection system includes one fixed communication terminal apparatus and two or more mobile communication terminal apparatuses, no two points selected by the point selection section 110 of the multipoint control unit 100 can be both fixed communication terminal apparatuses. Thus, the point selection information output by the point selection section 110 cannot be the case 3, and the point selection information output by the point selection section 110 is any of the cases 1, 2, 4 and 5. In addition, in this case, when the fixed communication terminal apparatus is included in the points selected by the point selection section 110, the points that are not selected by the point selection section 110 cannot include the fixed communication terminal apparatus, and so the bit stream generation section 120 of the multipoint control unit 100 cannot output the bit stream of the second pattern when the point selection information is the information of the case 1, and cannot output the bit stream of the third pattern when the point selection information is the information of the case 4, whereas the bit stream generation section 120 outputs the bit streams of the first pattern and the third pattern when the point selection information is the information of the case 1, and outputs the bit streams of the first, second and fourth patterns when the point selection information is the information of the case 4. In addition, in this case, a decoding section 222-1 of a sound signal fixed reception side unit 220-1 of the fixed communication terminal apparatus 200-1 cannot perform the process of the above-described case A, but the decoding section 222-1 performs the process of any of the cases B to D.

In addition, when N is 1, that is, when the multipoint phone connection system includes two or more fixed communication terminal apparatuses and one mobile communication terminal apparatus, no two points selected by the point selection section 110 of the multipoint control unit 100 can be both mobile communication terminal apparatuses. Thus, the point selection information output by the point selection section 110 cannot be the case 5, and the point selection information output by the point selection section 110 is any of the cases 1 to 4. In addition, in this case, when the mobile communication terminal apparatus is included in the points selected by the point selection section 110, the points that are not selected by the point selection section 110 cannot include the mobile communication terminal apparatus, and so the bit stream generation section 120 of the multipoint control unit 100 cannot output the bit stream of the second pattern when the point selection information is the information of the case 2, and cannot output the bit stream of the fourth pattern when the point selection information is the information of the case 4, and outputs the bit streams of the first pattern and the third pattern when the point selection information is the information of the case 2, and outputs the bit streams of the first pattern, the second pattern and the third pattern when the point selection information is the information of the case 4.

Number of Points Selected by Point Selection Section

In addition, for the sake of simplicity of description, the above-mentioned embodiments are described with an example in which the point selection section 110 of the multipoint control unit 100 selects one or two points. However, the number of points selected by the point selection section 110 is not limited thereto, and three or more points may be selected as long as the monaural code obtained by the above-described first coding scheme falls within a range of the communication capacity for real-time transmission through the transmission path for a voice line of a fixed phone. That is, it suffices that the point selection section 110 of the multipoint control unit 100 selects up to K (K is an integer of 2 or greater) points. In this case, the bit stream generation section 120 of the multipoint control unit 100, each fixed communication terminal apparatus 200-*m*, and each mobile communication terminal apparatus 300-*n* operate as follows.

Communication Terminal Apparatus Having a Value of 0 for the Number of Selected Points Other than the Point of the Communication Terminal Apparatus itself, and Operation of Bit stream Generation Section for that Communication Terminal Apparatus When the number of selected points is one (i.e., K is 1), the terminal apparatus of the selected point has a value of 0 for the number of selected points other than the point of the terminal apparatus itself. The bit stream generation section 120 of the multipoint control unit 100 does not output a code string representing a sound signal to the communication terminal apparatus having a value of 0 for the number of selected points other than the point of the communication terminal apparatus itself as described above in the first embodiment. The communication terminal apparatus having a value of 0 for the number of selected points other than the point of the communication terminal apparatus itself does not decode a code string representing a sound signal, and does not obtain a decoded sound signal as described above in the first embodiment.

Fixed Communication Terminal Apparatus Having a Value of 1 for the Number of Selected Points Other than the Point of Fixed Communication Terminal Apparatus itself, and Operation of Bit stream Generation Section for that Fixed Communication Terminal Apparatus When the number of the selected points is two (i.e., K is 2), the terminal apparatus of each selected point has a value of 1 for the number of selected points other than the point of terminal apparatus itself. In addition, when the number of selected points is one (i.e., K is 1), the terminal apparatus of each unselected point has a value of 1 for the number of selected points other than the unselected point itself.

The bit stream generation section 120 of the multipoint control unit 100 generates and outputs the bit stream including, at least a monaural code of the selected point as a code representing a sound signal for the fixed communication terminal apparatus having a value of 1 for the number of selected points other than the point of the terminal apparatus itself as described above in the first embodiment, and, including the extension code of the selected point as a code representing a sound signal when there is an extension code of the selected point.

Specifically, to the fixed communication terminal apparatus having a value of 1 for the number of selected points other than the point of the terminal apparatus itself, the bit stream generation section 120 of the multipoint control unit 100 generates and outputs a bit stream including a monaural code and an extension code of the selected point as a code representing a sound signal when the selected point is a fixed communication terminal apparatus, and generates and outputs a bit stream including a monaural code of the selected point as a code representing a sound signal when the selected point is a mobile communication terminal apparatus. The decoding section of the fixed communication terminal apparatus having a value of 1 for the number of selected points other than the point of the terminal apparatus itself obtains a decoded sound signal of the selected point by decoding a monaural code of the selected point, and decoding an extension code of the selected point when there is an extension code of the selected point as described above in the first embodiment.

Mobile Communication Terminal Apparatus Having a Value of 1 for the Number of Selected Points Other than the Point of the Mobile Communication Terminal Apparatus Itself, and Operation of Bit Stream Generation Section for that Mobile Communication Terminal Apparatus When the number of the selected points is two (i.e., K is 2), the terminal apparatus of each selected point has a value of 1 for the number of selected points other than the point of terminal apparatus itself. In addition, when the number of selected points is one (i.e., K is 1), the terminal apparatus of each unselected point has a value of 1 for the number of selected points other than the unselected point itself. The bit stream generation section 120 of the multipoint control unit 100 generates and outputs, to the mobile communication terminal apparatus having a value of 1 for the number of selected points other than the point of the mobile communication terminal apparatus itself, a bit stream including a monaural code of the selected point as a code representing a sound signal as described above in the first embodiment. The decoding section of the mobile communication terminal apparatus having a value of 1 for the number of selected points other than the point of the mobile communication terminal apparatus itself obtains a decoded sound signal of the selected point by decoding a monaural code of the selected point as described above in the first embodiment.

Fixed Communication Terminal Apparatus Having a Value of 2 or More for the Number of the Fixed Communication Terminal Apparatus Itself, and Operation of Bit Stream Generation Section for that Fixed Communication Terminal Apparatus When the number of the selected points is three or more (i.e., K is equal to or greater than 3), the terminal apparatus of each selected point has a value of 2 or more for the number of selected points other than the point of the terminal apparatus itself. In addition, when the number of the selected points is two or more (i.e., K is equal to or greater than 2), the terminal apparatus of each unselected point has a value of 2 or more for the number of selected points other than the unselected point itself. The bit stream generation section 120 of the multipoint control unit 100 generates and outputs, to the fixed communication terminal apparatus where the number of selected points other than the own point is two or more, a bit stream for a fixed terminal including k monaural codes included in sending bit streams output by the two or more (k, which is an integer from 2 to K) selected communication terminal apparatuses as codes representing a sound signal, and a control code representing that the code information is "information representing that a code included in a code string representing a sound signal is k monaural codes". The control information analysis section of the sound signal fixed reception side unit of the fixed communication terminal apparatus having a value of 2 or more for the number of selected points other than the point of the fixed communication terminal apparatus itself outputs, to the decoding section, code information that is "information representing that a code included in a code string representing a sound signal is k monaural codes" and k monaural codes. The decoding section of the sound signal fixed reception side unit of the fixed communication terminal apparatus having a value of 2 or more for the number of selected points other than the point of the fixed communication terminal apparatus itself obtains k decoded digital sound signals by decoding each of the input k monaural codes by the above-described first decoding scheme, and outputs the signals. Note that the playback section of the sound signal fixed reception side unit of each fixed communication terminal apparatus may include up to K DA conversion sections and up to K speakers.

Mobile Communication Terminal Apparatus Having a Value of 2 or More for the Number of Selected Points Other than the Point of the Mobile Communication Terminal Apparatus Itself, and Operation of Bit Stream Generation Section for that Mobile Communication Terminal Apparatus When the number of the selected points is three or more (i.e., K is equal to or greater than 3), the terminal apparatus of each selected point has a value of 2 or more for the number of selected points other than the point of the terminal apparatus itself. In addition, when the number of the selected points is two or more (i.e., K is equal to or greater than 2), the terminal apparatus of each unselected point has a value of 2 or more for the number of selected points other than the unselected point itself.

For the mobile communication terminal apparatus having a value of 2 or more for the number of selected points other than the mobile communication terminal apparatus itself, the bit stream generation section 120 of the multipoint control unit 100 obtains k decoded digital sound signals by decoding each monaural code included in bit streams output by the two or more (k, which is an integer from 2 to K) selected communication terminal apparatuses, and obtains a mixed digital sound signal by mixing the obtained k decoded digital sound signals obtains a monaural code by coding the mixed digital sound signal by the above-described first coding scheme, and generates and outputs a bit stream for a mobile terminal including the one monaural code obtained from the mixed digital sound signal as a code representing a sound signal. The decoding section of the mobile communication terminal apparatus having a value of 2 or more for the number of selected points other than the mobile communication terminal apparatus itself obtains one decoded digital sound signal by decoding the one monaural code by the above-described first decoding scheme, and outputs the signal.

Number of Terminal Apparatuses in Configuration in which Point Selection Section Selects K Points As is clear from the above two descriptions, it suffices that when K (K is an integer of 2 or greater) is set as the number with which the monaural code obtained by the above-described first coding scheme falls within the range of the communication capacity for real-time transmission through the transmission path for a voice line of a fixed phone, the multipoint phone connection system has a configuration in which the point selection section 110 of the multipoint control unit 100 selects up to K points, including one or more fixed communication terminal apparatuses and one or more mobile communication terminal apparatuses such that the total number of fixed communication terminal apparatuses and mobile communication terminal apparatuses is K+1 or more. That is, it suffices that in the multipoint phone connection system of the above-mentioned embodiments, M≥1, N≥1, and M+N≥K+1.

Number of Channels of Sound Signal of Fixed Communication Terminal Apparatus

In addition, for the sake of simplicity of description, the above-mentioned embodiments are described with an example in which the sound signal fixed transmission side unit 210-$m$ of the fixed communication terminal apparatus 200-$m$ obtains and outputs a bit stream including a code corresponding to digital sound signals of two channels. However, the number of channels is not limited thereto as long as two or more channels are provided. When the number of channels is set to C (C is an integer of 2 or greater), in this case, it suffices that the sound pickup section 211-$m$ of the sound signal fixed transmission side unit 210-$m$ of the fixed communication terminal apparatus 200-$m$ includes C microphones and C AD conversion sections, and it suffices that, for each frame, the coding section 212-$m$ of the sound signal fixed transmission side unit 210-$m$ of the fixed communication terminal apparatus 200-$m$ obtains a monaural code by coding a mixed signal of digital sound signals of C channels input from the sound pickup section 211-$m$ by the predetermined first coding scheme, and obtains an extension code including a code representing information corresponding to a difference between the input digital sound signals of C channels. It suffices that, in this case, instead of the above-described case A, the decoding section 222-$m$ of the sound signal fixed reception side unit 220-$m$ of the fixed communication terminal apparatus 200-$m$ obtains a provisional decoded digital sound signal by decoding the input monaural code by the predetermined first decoding scheme, and obtains decoded difference information from a code representing information corresponding to a difference included in the input extension code, then obtains, from the obtained provisional decoded digital sound signal and the obtained decoded difference information, C decoded digital sound signals by regarding the provisional decoded digital sound signal as C decoded digital sound signals mixed signal, and regarding the decoded difference information as information corresponding to the difference between C decoded digital sound signals and outputs the C decoded digital sound signals. In addition, when the input extension code includes not only a difference code that is a code representing information corresponding to the difference, but also an error code, it suffices that the decoding section 222-$m$ further obtains decoded error information from an error code included in the input extension code, obtains C decoded digital sound signals, from the provisional decoded digital sound signal, the decoded error information and the decoded difference information, by regarding the provisional decoded digital sound signal as a mixed signal of C decoded sound signals, regarding the decoded error information as information corresponding to an error of the provisional decoded digital sound signal, and regarding the decoded difference information as information corresponding to the difference between C decoded digital sound signals and outputs the C decoded digital sound signals. In addition, in the above-mentioned cases, the playback section 223-$m$ of the sound signal fixed reception side unit 220-$m$ of the fixed communication terminal apparatus 200-$m$ may include up to C DA conversion sections and up to C speakers. Note that when coding the information corresponding to a difference between the input digital sound signals of C channels, the coding section 212-$m$ obtains a code representing information corresponding to the difference by coding information corresponding to the difference between channels of input digital sound signals of C channels by the predetermined second coding scheme, and includes the code in the extension code so that the decoding section 222-$m$ may obtain decoded difference information by decoding the code representing the information corresponding to the difference included in the input extension code by the predetermined second decoding scheme. As the second decoding scheme and the second coding scheme, a multichannel decoding scheme (ISO/IEC 14496-3 11.6.8.1.2) of MPEG-4 ALS standard and a processing technique used in a coding scheme corresponding to that scheme may be used, for example Note that the information corresponding to a difference between channels of digital sound signals of C channels is waveform information representing a difference between digital sound signals of C channels, a feature parameter representing a difference between digital sound signals of C channels or the like as in the above-described first embodiment.

Program and Recording Medium

The process of each section of the first communication network terminal apparatus 200-$m$, the second communication network terminal apparatus 300-$n$, and the multipoint control unit 100 may be implemented by a computer. In other words, the process of each step of a coding method that is a coding side method corresponding to the first communication network terminal apparatus 200-$m$, and a decoding method that is a decoding side method corresponding to the first communication network terminal apparatus 200-$m$ may be implemented by a computer. In addition, the process of each step of the method corresponding to the second communication network terminal apparatus 300-$n$ may be implemented by a computer. In addition, the process of each step of the multipoint control method corresponding to the multipoint control unit 100 may be implemented by a computer. In this case, the process of each step is described by a program. Then, by implementing this program by a computer, the process of each step is implemented by the computer.

Each program in which the processing details are described may be recorded in a computer-readable recording medium. The computer-readable recording medium can be any type of medium such as a magnetic recording device, an optical disc, a magneto-optical recording medium, or a semiconductor memory.

The processing of each part may be composed by causing the computer to execute a predetermined program on the computer, or at least a part of the processing may be implemented in the form of hardware.

It is needless to say that the present disclosure can appropriately be modified without departing from the gist of the present disclosure.

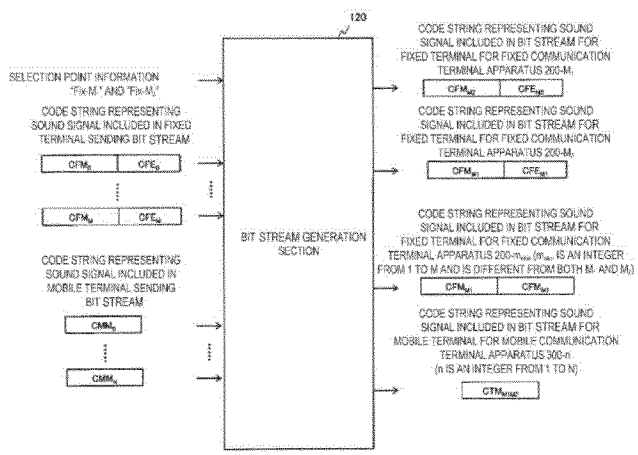

The invention claimed is:

1. A multipoint control method in a multipoint control unit to which two or more first communication network terminal apparatuses and one or more second communication network terminal apparatuses are connected through a communication path, the number of points at which the two or more first communication network terminal apparatuses are located being M (M is an integer of 2 or greater), the number of points at which the one or more second communication network terminal apparatuses are located being N (N is an integer of 1 or greater), the method comprising:

a point selecting step of, for a predetermined time period, selecting, by the multipoint control unit, one point or two points from among M points at which the two or more first communication network terminal apparatuses are located and N points at which the one or more second communication network terminal apparatuses are located, a bit stream input from each first communication network terminal apparatus to the multipoint control unit through the communication path being a bit stream including, as codes representing a sound signal, a monaural code $CFM_m$ (m is an integer from 1 to M) obtained by coding a mixed signal of sound signals of two or more channels input to the first communication network terminal apparatus by a first coding scheme and an extension code $CFE_m$ including a code representing information corresponding to a difference between the input sound signals of two or more channels, and a bit stream input from each second communication network terminal apparatus to the multipoint control unit through the communication path being a bit stream including, as a code representing a sound signal, a monaural code $CMM_n$ (n is an integer from 1 to N) obtained by coding a sound signal of one channel input to the second communication network terminal apparatus by the first coding scheme; and a bit stream generating step of, when two first communication network terminal apparatuses of two points of an $M_{1\text{-}th}$ point and an $M_{2\text{-}th}$ point ($M_1$ is an integer from 1 to M, and $M_2$ is an integer from 1 to M and different from $M_1$) are selected from the two or more first communication network terminal apparatuses and the one or more second communication network terminal apparatuses, generating and outputting, by the multipoint control unit, as a bit stream for an unselected first communication network terminal apparatus of the two or more first communication network terminal apparatuses that is located at a point that is not selected in the point selecting step, a bit stream including, as codes representing a sound signal, a monaural code $CFM_{M1}$ of codes representing a sound signal of the $M_{1\text{-}th}$ point and a monaural code $CFM_{M2}$ of codes representing a sound signal of the $M_{2\text{-}th}$ point.

2. The multipoint control method according to claim 1, wherein, in the bit stream generating step, when the first communication network terminal apparatuses of the $M_{1\text{-}th}$ point and the $M_{2\text{-}th}$ point are selected in the point selecting step, a bit stream is generated and output, the bit stream including, as a code representing a sound signal, a monaural code $CFM_{m'}$ (m' is $M_1$ or $M_2$) and an extension code $CFE_{m'}$ that are codes representing a sound signal of an m'-th point for each of the first communication network terminal apparatuses of the $M_{1\text{-}th}$ point and the $M_{2\text{-}th}$ point selected in the point selecting step such that $M_1$ is arranged for $M_2$ as m' and $M_2$ is arranged for $M_1$ as m'.

3. The multipoint control method according to claim 1, wherein, in the bit stream generating step, when the first communication network terminal apparatuses of the $M_{1\text{-}th}$ point and the $M_{2\text{-}th}$ point are selected in the point selecting step, a bit stream is generated and output by obtaining a first decoded sound signal by decoding the monaural code $CFM_{M1}$ that is one of the codes representing a sound signal of the $M_{1\text{-}th}$ point by a first decoding scheme corresponding to the first coding scheme, obtaining a second decoded sound signal by decoding the monaural code $CFM_{M2}$ that is one of the codes representing a sound signal of the $M_{2\text{-}th}$ point by the first decoding scheme, obtaining a mixed sound signal by mixing the first decoded sound signal and the second decoded sound signal, and obtaining a monaural code $CTM_{M1M2}$ by coding the mixed sound signal by the first coding scheme, the bit stream including, as a code representing a sound signal, the monaural code $CTM_{M1M2}$ obtained from the mixed sound signal as a bit stream for each second communication network terminal apparatus of a point.

4. A multipoint control unit to which two or more first communication network terminal apparatuses and one or more second communication network terminal apparatuses are connected through a communication path, the number of points at which the two or more first communication network terminal apparatuses are located being M (M is an integer of 2 or greater), the number of points at which the one or more second communication network terminal apparatuses are located being N (N is an integer of 1 or greater), the multipoint control unit comprising:

processing circuitry configured to, for a predetermined time period, select one point or two points from among M points at which the two or more first communication network terminal apparatuses are located and N points at which the one or more second communication network terminal apparatuses are located, a bit stream input from each first communication network terminal apparatus to the multipoint control unit through the communication path being a bit stream including, as codes representing a sound signal, a monaural code $CFM_m$ (m is an integer from 1 to M) obtained by coding a mixed signal of sound signals of two or more channels input to the first communication network terminal apparatus by a first coding scheme and an extension code $CFE_m$ including a code representing information corresponding to a difference between the input sound signals of two or more channels, and a bit stream input from each second communication network terminal apparatus to the multipoint control unit through the communication path being a bit stream including, as a code representing a sound signal, a monaural code $CMM_n$ (n is an integer from 1 to N) obtained by coding a sound signal of one channel input to the second communication network terminal apparatus by the first coding scheme, wherein the processing circuitry is configured to, when two first communication network terminal apparatuses of two points of an $M_{1\text{-}th}$ point and an $M_{2\text{-}th}$ point ($M_1$ is an integer from 1 to M, and $M_2$ is an integer from 1 to M and different from $M_1$) are selected from the two or more first communication network terminal apparatuses and the one or more second communication network terminal apparatuses, generate and output, as a bit stream for an unselected first communication network terminal apparatus of the two or more first communication network terminal apparatuses that is located at a point that is not selected by the processing circuitry, as codes representing a sound signal, a monaural code $CFM_{M1}$ of codes representing a sound signal of the $M_{1\text{-}th}$ point and a monaural code $CFM_{M2}$ of codes representing a sound signal of the $M_{2\text{-}th}$ point.

5. The multipoint control unit according to claim 4, wherein, when the first communication network terminal apparatuses of the $M_{1\text{-}th}$ point and the $M_{2\text{-}th}$ point are selected by the processing circuitry, the processing circuitry is configured to further generate and output a bit stream including, as a code representing a sound signal, a monaural code $CFM_{m'}$ (m' is M1 or M2) and an extension code $CFE_{m'}$ that are codes representing a sound signal of an m'-th point for each of the first communication network terminal apparatuses of the $M_{1\text{-}th}$ point and the $M_{2\text{-}th}$ point selected by the processing circuitry such that $M_1$ is arranged for $M_2$ as m' and $M_2$ is arranged for $M_1$ as m'.

6. The multipoint control unit according to claim 4, wherein, when the first communication network terminal apparatuses of the $M_{1\text{-}th}$ point and the $M_{2\text{-}th}$ point are selected by the processing circuitry, the processing circuitry is configured to further generate and output a bit stream by obtaining a first decoded sound signal by decoding the monaural code $CFM_{M1}$ that is one of the codes representing a sound signal of the $M_{1\text{-}th}$ point by a first decoding scheme corresponding to the first coding scheme, obtaining a second decoded sound signal by decoding the monaural code $CFM_{M2}$ that is one of the codes representing a sound signal of the $M_{2\text{-}th}$ point by the first decoding scheme, obtaining a mixed sound signal by mixing the first decoded sound signal and the second decoded sound signal, and obtaining a monaural code $CTM_{M1M2}$ by coding the mixed sound signal by the first coding scheme, the bit stream including, as a code representing a sound signal, the monaural code $CTM_{M1M2}$ obtained from the mixed sound signal as a bit stream for each second communication network terminal apparatus of a point.

7. A non-transitory computer recording medium which stores a program which causes a computer to execute each step of the multipoint control method according to claim 1.

* * * * *

UNITED STATES PATENT AND TRADEMARK OFFICE
CERTIFICATE OF CORRECTION

PATENT NO. : 11,810,581 B2
APPLICATION NO. : 17/422711
DATED : November 7, 2023
INVENTOR(S) : Moriya et al.

It is certified that error appears in the above-identified patent and that said Letters Patent is hereby corrected as shown below:

On the Title Page

Delete the title page and substitute therefore with the attached title page consisting of the corrected illustrative figure In the Claims In Column 52, Line 66 of Claim 4, the text reading:
-circuitry, as codes-
Should read:
--circuitry, a bit stream including, as codes--

Signed and Sealed this
Second Day of July, 2024

Katherine Kelly Vidal
*Director of the United States Patent and Trademark Office*

(12) United States Patent
Moriya et al.

(10) Patent No.: US 11,810,581 B2
(45) Date of Patent: Nov. 7, 2023

(54) MULTIPOINT CONTROL METHOD, APPARATUS AND PROGRAM

(71) Applicant: NIPPON TELEGRAPH AND TELEPHONE CORPORATION, Tokyo (JP)

(72) Inventors: Takehiro Moriya, Tokyo (JP); Yutaka Kamamoto, Tokyo (JP); Ryosuke Sugiura, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 328 days.

(21) Appl. No.: 17/422,711

(22) PCT Filed: Jan. 7, 2020

(86) PCT No.: PCT/JP2020/000101
§ 371 (c)(1),
(2) Date: Jul. 13, 2021

(87) PCT Pub. No.: WO2020/149164
PCT Pub. Date: Jul. 23, 2020

(65) Prior Publication Data
US 2022/0084530 A1    Mar. 17, 2022

(30) Foreign Application Priority Data
Jan. 17, 2019   (JP) .................................. 2019-006306

(51) Int. Cl.
*G10L 19/008*   (2013.01)
*G10L 19/16*    (2013.01)
(Continued)

(52) U.S. Cl.
CPC .......... *G10L 19/008* (2013.01); *G10L 19/173* (2013.01); *H04M 3/561* (2013.01); *H04M 3/568* (2013.01); *H04M 7/006* (2013.01)

(58) Field of Classification Search
CPC ..... G10L 19/008; G10L 19/173; G10L 19/24; H04M 3/561; H04M 3/568; H04M 7/006; H04L 65/403; H04L 65/80
(Continued)

(56) References Cited

U.S. PATENT DOCUMENTS

| | | | |
|---|---|---|---|
| 7,619,995 B1 * | 11/2009 | El-Hennawey | H04L 12/1827 370/266 |
| 2010/0316232 A1 | 12/2010 | Acero et al. | |
| 2015/0055770 A1 | 2/2015 | Spittle et al. | |

FOREIGN PATENT DOCUMENTS

| | | | | |
|---|---|---|---|---|
| CN | 101877643 A | * | 11/2010 | .......... G10L 19/008 |
| FR | 3003683 A1 | * | 9/2014 | .......... G10L 19/167 |
| JP | 2005-229259 A | | 8/2005 | |

OTHER PUBLICATIONS

Dolby Laboratories Inc. (2018) "IVAS design constraints from an end-to-end perspective" 3GPP TSG-SA4#100 meeting, Oct. 15-19, 2018, Kochi, India, 12 pages.
(Continued)

*Primary Examiner* — Pierre Louis Desir
*Assistant Examiner* — Fouzia Hye Solaiman

(57) ABSTRACT

A technique is provided that can reduce degradation of the sound quality due to a tandem connection of paired coding and decoding, and can reduce the operation processing amount and the required memory amount of a multipoint control unit. In multipoint connection between terminals of a plurality of communication networks (for example, a fixed phone line and a mobile phone line) having different communication capacities, when a multichannel coding including a monaural coding scheme of a communication network
(Continued)